(12) United States Patent
McCutchen

(10) Patent No.: US 7,901,485 B2
(45) Date of Patent: Mar. 8, 2011

(54) RADIAL COUNTERFLOW CARBON CAPTURE AND FLUE GAS SCRUBBING

(75) Inventor: Wilmot H. McCutchen, Orinda, CA (US)

(73) Assignee: McCutchen Co., Portland, OR (US)

( * ) Notice: Subject to any disclaimer, the term of this patent is extended or adjusted under 35 U.S.C. 154(b) by 744 days.

(21) Appl. No.: 11/827,634

(22) Filed: Jul. 11, 2007

(65) Prior Publication Data
US 2009/0013867 A1 Jan. 15, 2009

(51) Int. Cl.
*B01D 45/14* (2006.01)

(52) U.S. Cl. .................. 95/35; 95/218; 95/270; 55/406; 55/407; 55/408; 96/284

(58) Field of Classification Search ................ 95/35, 32, 95/218, 270; 55/406, 407, 408; 96/281, 96/282, 289
See application file for complete search history.

(56) References Cited

U.S. PATENT DOCUMENTS

| | | | |
|---|---|---|---|
| 512,340 A | 1/1894 | Tesla | |
| 2,685,335 A | 8/1954 | McCutchen | |
| 3,187,898 A | 6/1965 | Baker | |
| 3,520,649 A | 7/1970 | Tomany et al. | |
| 3,731,800 A | 5/1973 | Timson | |
| 3,755,644 A | 8/1973 | Lewis | |
| 3,769,781 A | 11/1973 | Klein et al. | |
| 3,990,968 A | 11/1976 | Oesterle | |
| 4,272,011 A | 6/1981 | Nagatomo et al. | |
| 4,273,562 A | 6/1981 | Niskanen | |
| 4,292,051 A | 9/1981 | Kime | |
| 4,326,666 A | 4/1982 | Fujiwara et al. | |
| 4,357,152 A | 11/1982 | Duske et al. | |
| 4,371,382 A * | 2/1983 | Ross ............................ | 210/788 |
| 4,490,252 A | 12/1984 | Brigante | |
| 4,668,383 A | 5/1987 | Watson | |
| 4,999,597 A | 3/1991 | Gaynor | |
| 5,133,190 A | 7/1992 | Abdelmalek | |
| 5,393,421 A | 2/1995 | Ohe et al. | |
| 5,466,270 A | 11/1995 | Abdelmalek | |
| 5,534,118 A | 7/1996 | McCutchen | |

(Continued)

OTHER PUBLICATIONS

Klaus J. Kronenberg, Experimental Evidence for Effects of Magnetic Fields on Moving Water, IEEE Transactions on Magnetics, vol. Mag-21, No. 5, Sep. 1985, 3 pgs.

(Continued)

*Primary Examiner* — Duane Smith
*Assistant Examiner* — Tiffany N Palmer
(74) *Attorney, Agent, or Firm* — Marger Johnson & McCollom, P.C.

(57) ABSTRACT

Vortex gas separation is forced in radial counterflow between counter-rotating coaxial centrifugal impellers. Feed is at the axis of rotation. Axial extraction of nitrogen and water vapor is driven by an axial pump and by back pressure from the tank while radially outward flow of carbon dioxide and scrubbing targets is driven by the impellers. Scrubbing of the concentrated targets is in high turbulence during a long residence time.

Tiny centrifugation effects of innumerable turbulent eddy vortices in a shear layer between the impellers and in the tank are integrated by the forcing regime of the impellers and the axial pump. Radial vortices caused by shear between the counter-rotating impellers provide coherent sink flow conduits for axial extraction of nitrogen ballast. Fine fly ash (PM-2.5) scrubbing is concurrent with NOx and SOx scrubbing and with carbon capture. Mechanically assisted and highly turbulent wet scrubbing shear thickens fine fly ash and precipitates into clumps of sludge, so the wastewater stream is easily treatable and requires no large storage tank.

22 Claims, 7 Drawing Sheets

U.S. PATENT DOCUMENTS

| | | | | |
|---|---|---|---|---|
| 5,554,343 | A | | 9/1996 | Wade |
| 5,688,377 | A | | 11/1997 | McCutchen |
| 5,728,186 | A | | 3/1998 | Jonsson |
| 5,824,136 | A | * | 10/1998 | Meline .............................. 95/29 |
| 5,902,224 | A | | 5/1999 | Bloom |
| 6,116,027 | A | * | 9/2000 | Smith et al. ...................... 60/648 |
| 6,292,085 | B1 | | 9/2001 | Cho |
| 6,294,139 | B1 | * | 9/2001 | Vicard et al. ................... 423/210 |
| 6,716,269 | B1 | | 4/2004 | Graff et al. |
| 7,033,481 | B1 | | 4/2006 | Schlager et al. |
| 7,150,836 | B2 | | 12/2006 | Meikrantz |
| 7,217,638 | B2 | | 5/2007 | Okawa |
| 7,238,289 | B2 | | 7/2007 | Suddath |
| 7,244,360 | B2 | | 7/2007 | Cho |

OTHER PUBLICATIONS

Sangho Lee et al., Control of Scale Formation in Reverse Osmosis By Membrane Rotation, Desalination 155 (2003), pp. 131-138.

Mushtaque Ahmed et al., Feasibility of Salt Production From Inland RO Desalination Plant Reject Brine: A Case Study, Desalination 158 (2003) pp. 109-117.

Vladimir Shtern et al., Collapse, Symmetry Breaking, and Hysteresis in Swirling Flows, Annu. Rev. Fluid Mech. 1999, 31:537-66, pp. 537-566.

A. De La Torre et al., Slow Dynamics in a Turbulent von Karman Swirling Flow, arXiv:physics/0702151v1, Feb. 19, 2007. 4 pgs.

Kevin T. Raterman et al., A Vortex Contactor for Carbon Dioxide Separations, www.netl.doe.gov/publications/proceedings/01/carbon_seq/7b3.pdf (date unknown), 11 pgs.

Andrew M. Crocker et al., Experimental Results of a Vortex Tube Air Separator for Advanced Space Transportation, AIAA 2003-4451, 39th Joint Propulsion Conference & Exhibit, Huntsville, Alabama, Jul. 20-23, 2003, pp. 1-12.

IPCC Special Report on Carbon Dioxide Capture and Storage, Chapter 3, Capture of CO2 (2005), pp. 108-122, 168-171.

US EPA, External Combustion Sources, Bituminous and Sub-bituminous Coal Combustion, Sep. 1998, 15 pgs.

P.J. Zandbergen et al., Von Karman Swirling Flows, Annu. Rev. Fluid Mech. 1987, 19: pp. 465-491.

Ivan Delbende et al., Various Aspects of Fluid Vortices, C.R. Mechanique 332 (2004) pp. 767-781.

Daviaud et al., Turbulence in Rotating Flows, 2005, http://www-drecam.cea.fr/spec/Pres/Git/TRF/trf.htm, 2 pgs.

J.M. Lopez, Characteristics of Endwall and Sidewall Boundary Layers in a Rotating Cylinder With a Differentially Rotating Endwall, J. Fluid Mech. (1998), vol. 359, pp. 49-79.

J.M. Ottino, Mixing, Chaotic Advection, and Turbulence, Annu. Rev. Fluid Mech. 1990, 22: pp. 207-253.

Secondment to the International Test Centre for CO2 Capture (ITC), University of Regina, Canada; Jan.-Mar. 2005, Report No. COAL R303 DTI/Pub URN 06/798, May 2005, pp. 1-94.

De La Torre, Slow dynamics in a turbulent von Karman swirling flow, arXiv.physics/ 0202151v1 Feb. 19, 2007.

Raterman, et al., "A Vortex Contactor for Carbon Dioxide Separation" www.netl.doe.gov/publications/proceedings/01/carbon_seq/7b3.pdf (date unknown).

Crocker, et al., "Experimental Results of a Vortex Tube Air Separator" AIAA 2003-4451 (2003).

IPCC Special Report Chapter 3, Capture of CO2 (2005) cf pp. 111-117, Table 1.1-1, -6, -7, -16, -20.

US EPA, "External Combustion Sources, 1.1 Bituminous and subituminous coal combustion" Sep. 1998.

Zandbergen, et al., "Von Karman Swirling Flows," Ann. Rev. Fluid Mech. 1987, 19: 465-91.

Delbende, et al. "Various aspects of fluid vortices," C. R. Mecanique 332 (2004) 767-781.

Daviaud, et al. "Turbulence in rotating flows" 2005 http://www-drecam.cea.fr/spec/Pres/Git/TRF/trf.htm.

Lopez, Characteristics of endwall and sidewall boundary layers in a rotating cylinder with a differentially rotating endwall, J. Fluid Mech. v. 359 pp. 49-79 (1998).

Ottino, "Mixing, Chaotic Advection, and Turbulence," Ann. Rev. Fluid Mech. 1990, 22: 207-53.

* cited by examiner

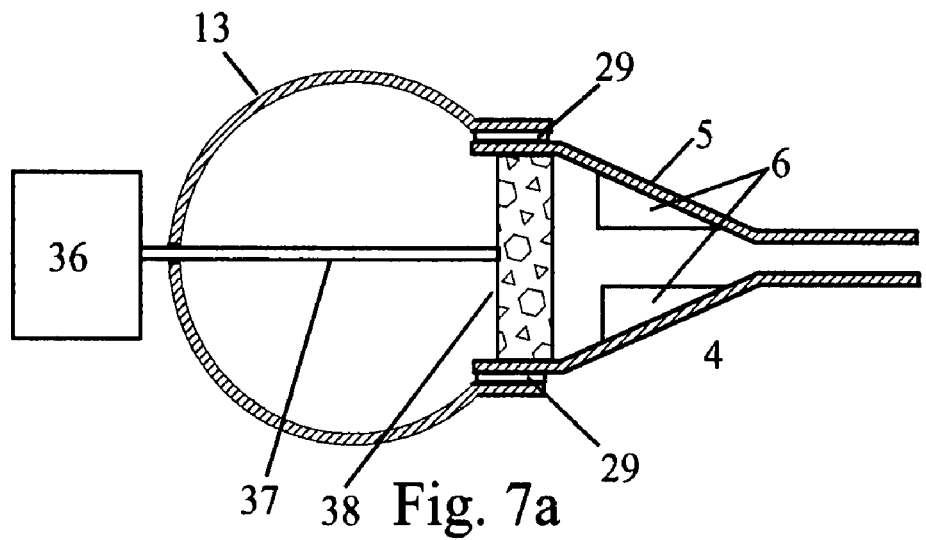
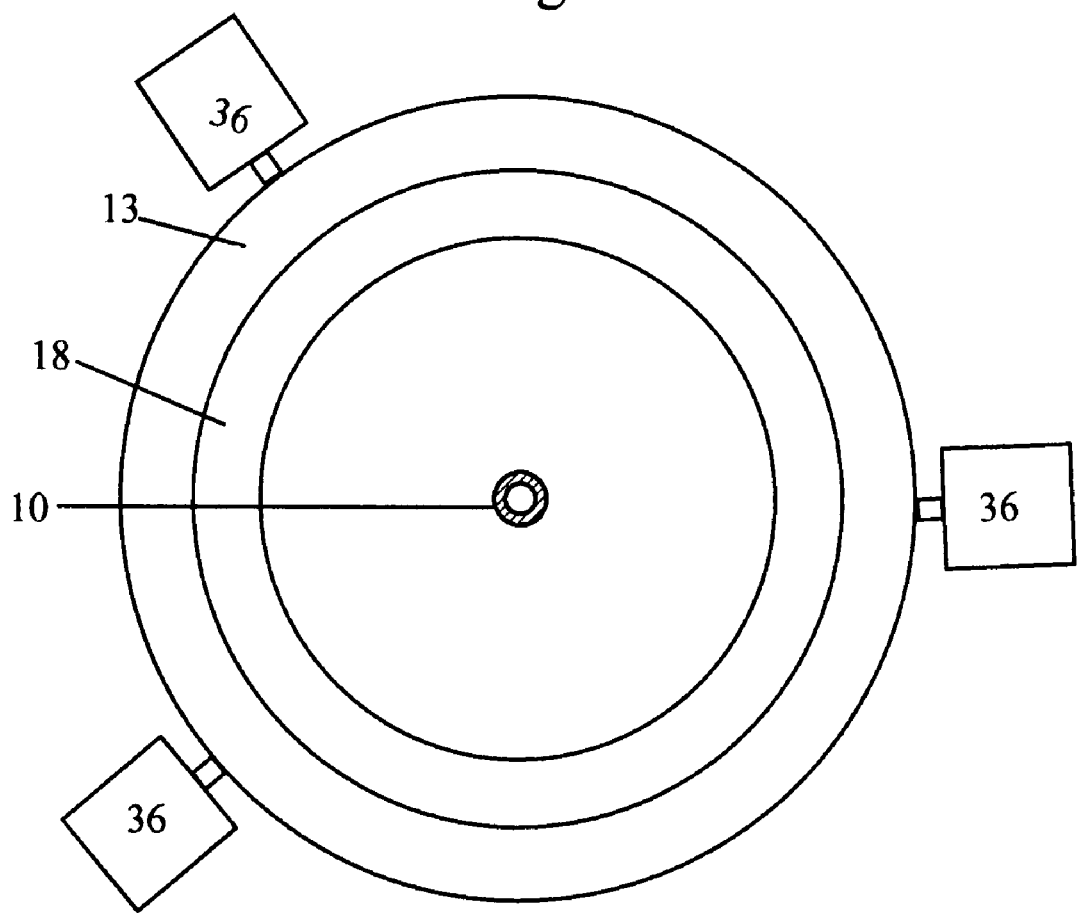
Fig. 7a
Fig. 7b

RADIAL COUNTERFLOW CARBON CAPTURE AND FLUE GAS SCRUBBING

BACKGROUND OF THE INVENTION

The present invention relates to moving centrifugal gas separation and to mechanically assisted highly turbulent scrubbing of gaseous emission streams. No membranes or other dead-end filtration media nor any means for electrostatic separation are involved. This is a new method of carbon capture, suitable for high volume hot and dirty low concentration waste gas streams such as flue gas from coal-fired power plants.

The separative method of the present invention comprises differential radial advection of light and heavy fractions. Light fractions (including nitrogen and water vapor) are advected radially inward by back pressure and axial suction, while simultaneously heavy fractions (including carbon dioxide, NOx, SOx, and particulates) are advected radially outward by centrifugal impellers. Flue gas from coal fired power plants is the principal application, but other industrial waste gases, as well as natural gas, can be centrifugally separated and cleaned by the apparatus and method disclosed herein.

In U.S. Pat. No. 5,688,377 to McCutchen (1997) I disclosed a peripherally fed mechanically driven radial counterflow device for fluid mixture separation. Axial feed and application to flue gas for particulate and other scrubbing is a non-obvious improvement with the advantage that in a peripherally fed device such as McCutchen '377, the separated heavy fractions would mix with incoming feed. Therefore carbon capture would be impossible.

By the term gaseous emission stream is meant a gaseous fluid mixture such as flue gas from coal-fired utility and industrial boilers, exhaust from combustion of natural gas, diesel fuel, or oil, as well as emissions from municipal and medical waste incinerators, cement and lime kilns, metal smelters, petroleum refineries, glass furnaces, and sulfuric acid manufacturing facilities. A gaseous emission stream comprises non-condensible gases, such as carbon dioxide and nitrogen, as well as condensible gases and aerosols. The various constituents, whether gaseous, liquid, or solid, of a gaseous emission stream are fractions.

Wet scrubbing uses injected liquid to contact scrubbing targets in a gaseous emission stream. The injected liquid could be water, in the case of aerosol scrubbing, or an aqueous scrubbing slurry such as limestone and water in the case of SOx scrubbing. For NOx and SOx scrubbing, a chemical reaction occurs between a reagent in the injected liquid and the target fraction, producing harmless products. Carbon dioxide scrubbing by an injected aqueous amine solution is one means for carbon capture known to the art. Dry scrubbing of SOx injects limestone powder into flue gas. Wet scrubbing of fly ash agglomerates tiny particles by contact with water to produce a fly ash slurry.

The purpose of scrubbing is to separate a gaseous emission stream into a stream of concentrated unwanted fractions and a separate stream of desired fractions. For flue gas scrubbing, the unwanted fractions include fly ash and other aerosols, NOx, SOx, and carbon dioxide; desired fractions are nitrogen, water vapor, oxygen, and argon, all of which may be safely discharged to the atmosphere. For natural gas scrubbing, the desired fraction is methane and the unwanted fractions include carbon dioxide, hydrogen sulfide, water, particulates, mercury, and mercaptans.

Advection is transport responding to a pressure gradient or body force. The term radial denotes a direction outward or inward with respect to some point or line. For example, a centrifugal pump advects fluid radially outward from its axis of rotation.

Differential radial advection of a gaseous emission stream is advection of heavy fractions radially outward and simultaneous advection of light fractions radially inward. The reference line for said radial flow is the axis of rotation of said at least one centrifugal impeller. Different advecting forces act in opposite directions and on different constituents. Heavy fractions are advected radially outward by momentum transport from the centrifugal impeller. Light fractions are advected radially inward by axial suction and by back pressure, simultaneously.

At thermal equilibrium, the various fractions in a gas mixture have different average speeds. For example, at room temperature (300 K), carbon dioxide ($CO_2$ molar mass 44 g/mol) has a root-mean-squared velocity, or average speed of its molecules, of 412 m/s, while nitrogen ($N_2$ molar mass 28 g/mol) is 25% faster at 517 m/s, and sulfur dioxide ($SO_2$ molar mass 64 g/mol) is 17% slower at 342 m/s. Water vapor ($H_2O$, molar mass 18 g/mol) is the fastest fraction of all at 645 m/s. Halliday, et al., *Fundamentals of Physics*, $4^{th}$ Ed., Table 21-1 p. 580 (1993).

The formula for radial acceleration, a (measured in units of g=9.81 m/s$^2$), is $a=v^2/r$ where v is the velocity of the molecule and r is the radius of the curve of its path. When a mixture of said gases (at 300 K) is constrained to rotate in a 1 mm radius vortex, $CO_2$ radial acceleration is 17.3 million g, $N_2$ is 27.2 million g, and $H_2O$ is 42.4 million g. The light fractions ($N_2$ and $H_2O$) will be accelerated toward the vortex axis at higher radial acceleration than the heavy fractions ($CO_2$ and $SO_2$), although the centripetal force affecting all fractions is the same, $1.24\times10^{-17}$ newtons. The radial acceleration of the light fractions, at a given vortex radius r, is much higher because of their their higher average speed.

Fine scale vortices will perform very high g separation of the fractions in the gas mixture because r in the formula is small. At higher temperatures than 300 K, vortex gas separation, due to the difference in radial acceleration of the light and heavy fractions, will be even stronger because the average speeds are higher for all fractions. The unsolved problem is how to force fine scale turbulence for vortex separation while collecting the separation effects. The present invention addresses that problem.

Coal Smoke.

Carbonaceous fuel combustion produces a gaseous emission stream called smoke. Each constituent of smoke is a fraction. Noxious fractions in smoke from coal-fired power plants include sulfur oxides (SOx, principally $SO_2$ and $SO_3$), nitrogen oxides (NOx, principally NO and $NO_2$), aerosols (fly ash, mercury vapor, dust, trace metals), and carbon dioxide ($CO_2$). There are also benign fractions (nitrogen gas, oxygen, and water vapor) which constitute approximately 85% of smoke by volume. Air used for combustion contains about 79% gaseous nitrogen ($N_2$), which is inert, so flue gas is approximately 75% nitrogen. Water vapor ($H_2O$) is created by combination of the hydrogen in the fuel with atmospheric oxygen during combustion. Much of the plume from flue gas stacks is water vapor forming a cloud as it contacts cool air.

The benign fractions in smoke have lower density (lower molar mass) than the noxious fractions. Therefore nitrogen gas, oxygen gas, and water vapor are referred to collectively as light fractions, and the noxious fractions (aerosols, NOx, SOx, and carbon dioxide) are referred to as heavy fractions. Carbon capture is the separation of carbon dioxide from the light fractions.

Coal is currently the dominant fuel in the power sector, accounting for 38% of electricity generated in 2000, with hydro power 17.5%, natural gas 17.3%, nuclear 16.8%, oil 9%, and non-hydro renewables 1.6%. Coal is projected to remain the dominant fuel for power generation in 2020 (about 36%), and natural gas power generation will become the second largest source, surpassing hydro. To combat the urgent problem of global warming, known post-combustion carbon capture methods (chemical sorption, membrane separation, and cryogenic distillation) would have to be scaled up to deal with the large streams of hot dirty dilute flue gas from coal fired and natural gas fired power plants. None has proved economically feasible so far.

Carbon Capture.

According to the IPCC Report on Carbon Capture (September 2005): "the power and industry sectors combined dominate current global CO2 emissions, accounting for about 60% of total CO2 emissions. Future projections indicate that the share of these sectoral emissions will decline to around 50% of global CO2 emissions by 2050 (IEA, 2002). The Co2 emissions in these sectors are generated by boilers and furnaces burning fossil fuels and are typically emitted from large exhaust stacks . . . . The largest amount of CO2 emitted from large stationary sources originates from fossil fuel combustion for power generation, with an average annual emission of 3.9 MtCO2 per source. Substantial amounts of CO2 arise in the oil and gas processing industries while cement production is the largest emitter from the industrial sector . . . . The ranges of the technical capture potential relative to total CO2 emissions are 9-12% (or 2.6-4.9 GtCO2) by 2020 and 21-45% (or 4.7-37.5 GtCO2) by 2050."

Clearly there has long been a critical but unmet need for improved carbon capture from the gaseous emission streams of power plants. Two obstacles stand in the way of economical carbon capture: (1) the high volume percentage of nitrogen (~75%), known as nitrogen ballast; and (2) the pollution of aerosols, NOx and SOx. Despite the efforts of many investigators having more than ordinary skill in the art of flue gas scrubbing or the art of centrifugal gas separation, no satisfactory answer to these two obstacles has been discovered. Any obvious steps using the teachings of McCutchen '377, which was published in 1997, or other prior art for the solution of such important problems, would have been evident long before now.

Three carbon capture processes are known to the art: cryogenic distillation, sorption, and membranes. The present invention introduces a fourth.

Cryogenic distillation captures carbon by liquefaction and separates out NOx and SOx by fractional distillation. Liquefaction is frustrated by nitrogen ballast, which compresses without liquefaction. The small partial pressure of NOx and SOx in flue gas (very much less than 1% by volume) and the small partial pressure of $CO_2$ (10-15% by volume) are both due to the high nitrogen ballast (75%).

For sorption processes, nitrogen ballast makes carbon dioxide molecules like needles in a haystack, so an inordinate amount of wastewater is generated in contacting enough targets to achieve satisfactory collection efficiency. Fly ash, a fine silica dust, plugs absorbers used in sorbtion processes. NOx and SOx combine with water to become corrosive acids and heat stable salts, causing loss in absorption capacity and coating of reclaimer tube surfaces. Aqueous amine scrubbing of carbon dioxide from natural gas is much easier than the same process applied to flue gas polluted by fly ash, NOx, and SOx.

Membranes or other dead-end filtration media are impractical for large scale carbon capture from flue gas because of the presence of fly ash, which plugs the pores.

In view of these problems, a need exists for an alternative means for carbon capture, and for improved scrubbing upstream of known carbon capture processes. Here is the position of the U.S. Department of Energy: "The low pressure and dilute concentration dictate a high actual volume of gas to be treated. Trace impurities in the flue gas tend to reduce the effectiveness of the CO2 adsorbing processes. Compressing captured CO2 from atmospheric pressure to pipeline pressure (1,200-2,000 pounds per square inch (psi)) represents a large parasitic load."

Both natural gas and coal-fired power plants emit voluminous streams of hot smoke, comprising 10-15% by volume carbon dioxide ($CO_2$) at approximately atmospheric pressure. These are low-concentration/low-partial-pressure sources, which are the most difficult for carbon capture.

Nitrogen Extraction.

No means for extracting nitrogen from flue gas upstream of carbon capture are known. Nitrogen ($N_2$) is a harmless gas which constitutes 75% of the volume of flue gas from coal-fired power plants. This is referred to as nitrogen ballast. Nitrogen might be safely discharged to the Earth's atmosphere, which is already 78% nitrogen. Other benign light fractions in flue gas are oxygen ($O_2$) (4%), water vapor (5%), and argon (1%). Altogether, approximately 85% of flue gas does not require any treatment at all, other than extraction. Extracting benign gases would increase concentration of carbon dioxide from only 10-15% in the gaseous emission stream to over 90%.

Centrifugal Gas Separation.

The molar mass of nitrogen gas ($N_2$) is only 28 g/mol (grams per mole of gas); carbon dioxide ($CO_2$) is 36% denser at 44 g/mol. Centrifugal gas separators which might exploit this 36% density difference are of two classes: mechanically driven and pressure driven.

Mechanically driven gas separators can exploit gas density differences as low as 1.5%, far beyond the performance required for flue gas separation. The ultracentrifuge is a very delicately balanced cylinder rotating at extreme speed and generating very high g force which radially stratifies gases by density within the cylinder. Such rotating cylinder centrifugal gas separators are dangerous because of their extremely high rotation speed.

Pressure driven devices include inertial collectors (also known as cyclones), and vortex tubes. Cyclones and vortex tubes are axial counterflow devices, wherein flow goes in opposite directions and the device is static.

Inertial collectors are used extensively to process gaseous emission streams to remove most aerosols. Cyclones have no moving parts. Tangential feed injected through the wall of a tank swirls downward along the wall in a first vortex, then swirls upward in a second vortex inside the first vortex. This is axial counterflow. Solids are centrifugated out against the wall of the tank and are collected at the bottom, and a cleaned gas exits the top with the second vortex. Cyclones, even cascaded, are ineffective even for the relatively easy job of separating out 2.5 micron fly ash. Nitrogen extraction by inertial collectors has not been reported and would appear to be impossible.

Another pressure driven centrifugal gas separation device without moving parts is the vortex tube. The net effect of a vortex tube is to separate a high pressure stream into two low pressure streams, one hotter and the other colder than the high pressure stream. Pressurized feed gas is tangentially injected into one end of a static tube having both ends open. The feed gas spirals in a first vortex to the opposite end, where there is a conical central flow impedance. Hot gas exits the tube around the flow impedance. A recirculation flow rebounds from the flow impedance in a second vortex inside the first vortex and exits the feed end cooler than the feed gas. Residence time in the vortex tube is on the order of milliseconds.

Application of the vortex tube has also been made to the separation of liquefied air into nitrogen and oxygen, to removing condensible vapors from natural gas, and to improving sorbent mixing for carbon dioxide scrubbing. The presence of fly ash in flue gas, the high energy requirement for pressurizing the feed, and the poor separation efficiency for gas/gas separation (gas fractionation) would appear to make the vortex tube unsuitable for extracting nitrogen from flue gas.

Fly Ash and Other Aerosols.

Aerosols comprise fly ash, soot, condensible vapors, mist, and dust. These fractions are airborne because they are very small. Scrubbing of aerosols agglomerates these fractions so they can be separated more easily downstream. However, approximately 6% by mass of particle emissions from pulverized bituminous and sub-bituminous coal combustion is in the form of aerosols too small to separate by known processes or devices.

Fly ash is fine inorganic (principally silicon dioxide) particulate matter formed during coal combustion. The most troublesome fly ash is in the form of minute silica dust less than 2.5 millionths of a meter (micron) in diameter (PM-2.5). Collected fly ash is valuable as a concrete additive and as a material for making durable and impervious bricks which require no firing. Fly ash can therefore be seen as both a problem and an unexploited resource.

Soot, another particulate emission, is uncombusted fuel, which is usually not a problem in power plants where combustion is complete. Combustion is frequently not complete, and in gaseous emission streams from ships and vehicles, soot is a serious problem.

Other aerosols include vapors, mist, dust, and trace metals. Mercury and VOCs (volatile organic compounds) are condensible vapors which are regulated emissions because of their known harmful effect. Mist is tiny liquid droplets, including sulfuric acid droplets, water droplets, and droplets from condensed condensible vapors. Dust is airborne fragments of inorganic material. Trace metals in flue gas include uranium, arsenic, lead, cobalt, chromium, and thorium.

Dry electrostatic precipitators (ESPs) are the principal means used for collecting aerosols from coal-fired flue gas. Other industries using ESPs for emission control are cement (dust), pulp and paper (salt cake and lime dust), petrochemicals (sulfuric acid mist), and steel (dust and fumes). A cathode in the flow path of a gaseous emission stream imparts a negative charge to the entrained particles. A positively charged collector plate (anode) downstream in the flow path attracts the negative charges. Charged aerosols adhere to the collector plate and agglomerate in a coating. The coating is dislodged by rapping into a hopper.

ESPs, when working properly and with the right fuel, may have an overall collection efficiency as high as 99.2%. Where ESPs fail is in collecting fly ash under 2.5 microns and other fine particulates. The size limit for effective aerosol collection in ESPs is approximately 10 microns.

Even lower collection efficiency for fine particulates is found in the performance of inertial collectors, such as cyclones. Estimated overall control efficiency for a cascade of multiple cyclones is 94%, but fine particulates mostly escape collection. Cyclones are often used as a precollector upstream of an ESP, fabric filter, or wet scrubber so that these devices can be specified for lower particle loadings to reduce capital and/or operating costs.

Wet Scrubbers for NOx, SOx, and Aerosols.

The 94% overall collection efficiency for particulates in prior art wet scrubbers is inferior to the maximum collection efficiency of ESPs. Mechanically aided wet scrubbers known to the art spray liquid onto centrifugal fan blades as waste gas flows through the fan. The advantage of mechanical assistance is less water usage and a smaller footprint. Collection takes place in the spray and in the film that forms on the fan blades.

Wet particulate scrubbers have the disadvantage of trading an air pollution problem for a water pollution problem.

Venturi scrubbers, the most turbulent of wet scrubbers, have the highest collection efficiency. Venturis are pressure driven devices which jet a combined stream of waste gas and liquid through a nozzle into a tank. However, venturis have the disadvantage that turbulence quickly dissipates into pressure. The time during which turbulent mixing occurs is short.

For NOx and SOx, the injected scrubbing liquid is an aqueous solution comprising sorbents (lime or limestone for SOx, ammonia for NOx). The sorbents react with the target gases to produce harmless products.

Removal efficiency for prior art wet SOx scrubbing ranges from 50-98%. As with all prior art wet scrubbers, the price paid for high removal efficiency is a large volume of dilute wastewater requiring storage and treatment and a consequent waste of space and resources. Dry SOx scrubbers have a lower removal efficiency, <80%, but do not create wastewater.

A known carbon capture process used in processing natural gas is wet scrubbing with aqueous amine solution. NOx, SOx, and aerosols in flue gas complicate the application of this known technology to high volume hot and dirty exhaust gas streams.

Low concentration of SOx and NOx (less than 1% by volume) in a high volume of nitrogen and other benign fractions means that a large amount of liquid must be injected in order to contact enough of the scarce scrubbing targets to achieve satisfactory removal efficiency. Low concentration also means that condensation is more difficult, due to low partial pressure.

SUMMARY OF THE PRESENT INVENTION

This is a new method of carbon capture, which separates a clean gaseous stream of concentrated carbon dioxide from a gaseous emission stream dynamically in radial counterflow. Cascading devices achieve satisfactory collection efficiency to permit atmospheric discharge of axially extracted nitrogen and water vapor.

An apparatus for differential radial advection of heavy and light fractions in flue gas from coal-fired power plants, or other gaseous emission streams, comprises means for axial feed between coaxial counter-rotating centrifugal impellers. High molar mass fractions (heavy fractions) such as carbon dioxide, NOx, SOx, mercury, and fly ash, are advected radially outward by the impellers into a tank. Low molar mass fractions (light fractions), such as nitrogen and water vapor, are advected radially inward by back pressure and axial suction, and are axially extracted to discharge or further treatment. Radial vortices between the impellers provide conduits for light fractions to flow radially inward, through the axial feed.

Highly turbulent mechanically assisted mixing and scrubbing during a long residence time in the high shear between the impellers, in combination with said upstream axial extraction of nitrogen ballast by differential radial advection, separates a clean stream of gaseous carbon dioxide from flue gas.

Fly ash and precipitates are agglomerated into clumps of sludge by shear thickening in the turbulence, and are recovered from the tank. Gases produced by sorbent reactions are continuously removed from the shearing reaction zones at the periphery of turbulent vortices. Continuous extraction of inert gases away from scrubbing targets and turbulent mechanically assisted mixing minimize the volume of injected liquid required for satisfactory collection efficiency of NOx, SOx, and aerosols.

The process may be thought of as organized turbulence. Tiny centrifugal separation effects in turbulent eddies are integrated by a forcing regime to produce radially divergent streams of heavy and light fractions, the heavy stream having a high concentration of carbon dioxide, and the light stream having a high concentration of nitrogen.

SUMMARY OF THE DRAWING FIGURES

FIG. 7a shows a detail of the preferred drive means for causing counter-rotation of centrifugal impellers in the preferred embodiment shown in FIG. 1.

FIG. 7b shows a top view of the preferred embodiment and its preferred drive means.

DRAWING REFERENCE NUMERALS

1—axial feed conduit
1a—feed gas source
2—axial feed port
3—work space
4—bottom impeller
5—top impeller
6—vanes
7—drive means
8—means for connection
9—axial exhaust port
10—exhaust conduit
11—axial pump, ejector/eductor
12—periphery of the impeller assembly
13—tank
14—baffle
15—radial feed conduit
16—injection port for scrubbing liquid
17—pinch section of impeller assembly
18—flare section of impeller assembly
19—impeller assembly
20—liquid source for scrubbing liquid
21—radial vortices, sink conduits
22—mixing zones between the radial vortices
23—laminar ring of the work space
24—turbulent ring of the work space
25—expansion ring of the work space
26—cooling means
27—gas vent
28—purge pump
29—movable seal
30—boundary layer
31—shear layer
32—recirculation flow pressure, back pressure
33—source flow
34—sink flow
35—casing
36—drive motor
37—drive spindle
38—drive wheel
39—bearing seal
40—movable seal
41—centrifugal impeller
42—impeller drive spindle

DETAILED DESCRIPTION OF THE PREFERRED EMBODIMENT

Figure 1:
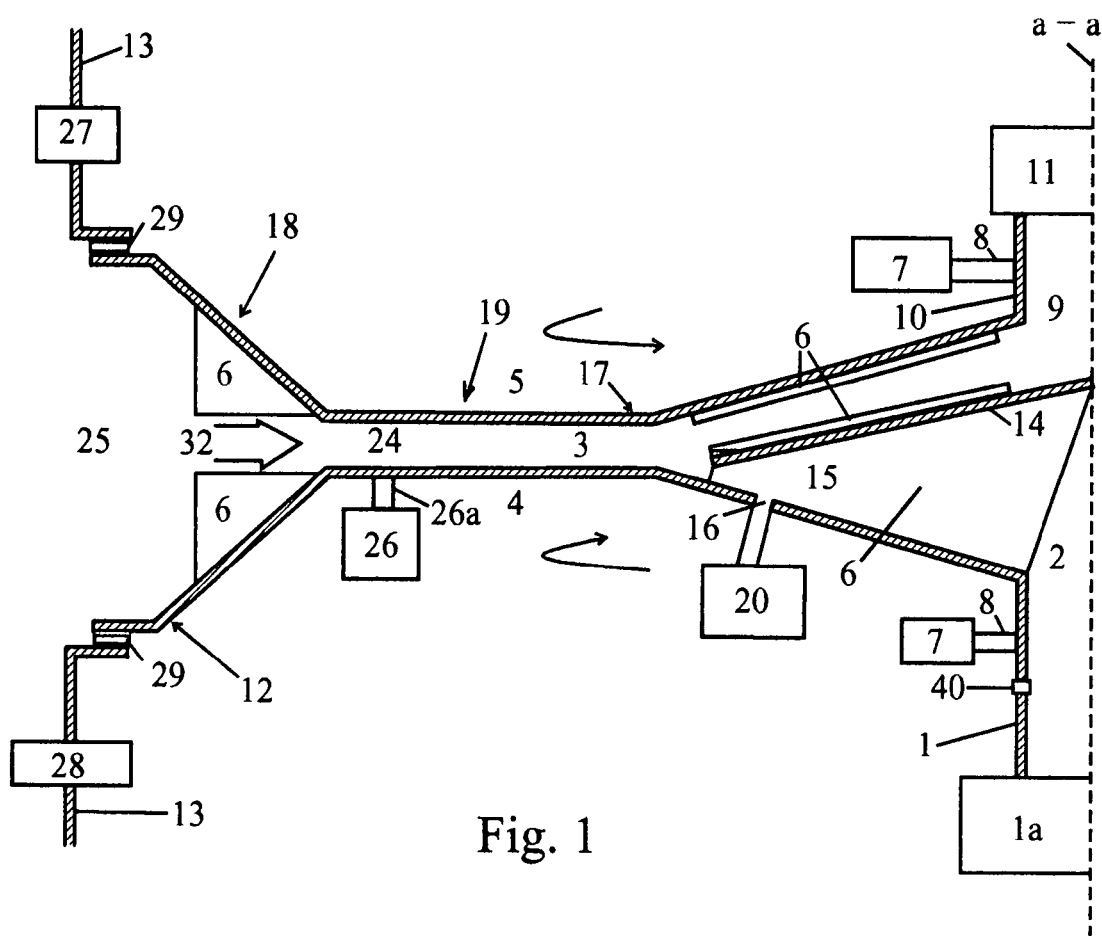
FIG. 1 shows a schematic elevational view of one half of the preferred embodiment, an apparatus comprising counter-rotating centrifugal impellers for carbon capture and scrubbing.

FIG. 1 shows a schematic cross-sectional elevational view of the preferred embodiment, an apparatus for concentrating and scrubbing a gaseous emission stream such as flue gas from coal combustion. The axis of symmetry and the axis of rotation is the axis a-a. Discussion of FIG. 1 will focus on application of the preferred embodiment to coal-fired flue gas treatment, although it could be used for other gaseous emission streams.

Feed gas (e.g., coal-fired power plant flue gas) flows continuously from a source 1a through an axial feed conduit 1 and into a work space 3 through an axial feed port 2 in an impeller assembly 19. Other gaseous emission streams include those from cement plants, sulfuric acid factories, medical waste incineration, industrial boilers, paper factories, steel mills, ships, and other industrial facilities. The term feed gas will refer to these as well. The term fluid refers to gases, liquids, and mixtures thereof. The term fluid mixture refers to mixtures of fluids, including mixtures comprising solids. Flue gas is a fluid mixture comprising heavy fractions (carbon dioxide, aerosols, sulfur oxides, mercury vapor, and nitrogen oxides) and light fractions (nitrogen, oxygen, and water vapor).

The impeller assembly 19 comprises counter-rotatable centrifugal impellers 4,5 having a common axis of rotation a-a and a periphery 12. The impellers are preferably constructed of rigid material, such as steel. Rotation of the impellers advects fluid radially outward in a work space 3 between the impellers. Suitable means (not shown) supporting the impellers maintain the impellers in an opposed and spaced-apart position so as to maintain the work space 3 between them. The preferred drive means shown in FIG. 7 maintains the impeller separation by the drive wheel 38. As shown, the separation between the supported impellers varies radially outward from their axis of rotation a-a, thereby defining a pinch section 17 and a flare section 18. Preferably, the impeller assembly is grounded by suitable means (not shown) to prevent shock.

The centrifugal impellers 4,5 of the impeller assembly 19 are connected by suitable means for connection 8 to drive means 7. The preferred embodiment of the drive means and connection means for causing approximately exact counter-rotation is shown in FIGS. 7a and 7b. Shown in FIG. 1 are alternative drive means 7 connected to each impeller. The impellers rotate approximately at the same angular velocity but in opposite directions. Preferably, for flue gas treatment on a large scale, rotation speed for each of the impellers is less than 1000 revolutions per minute (rpm). Many suitable drive means 7 are known to the art, including separate motors for each impeller, and various suitable means for connection 8 so as to cause counter-rotation of the impellers are known, including belt drives and gears. For example, airplanes and helicopters having counter-rotating propellers connected by planetary gears are known.

Figure 2:
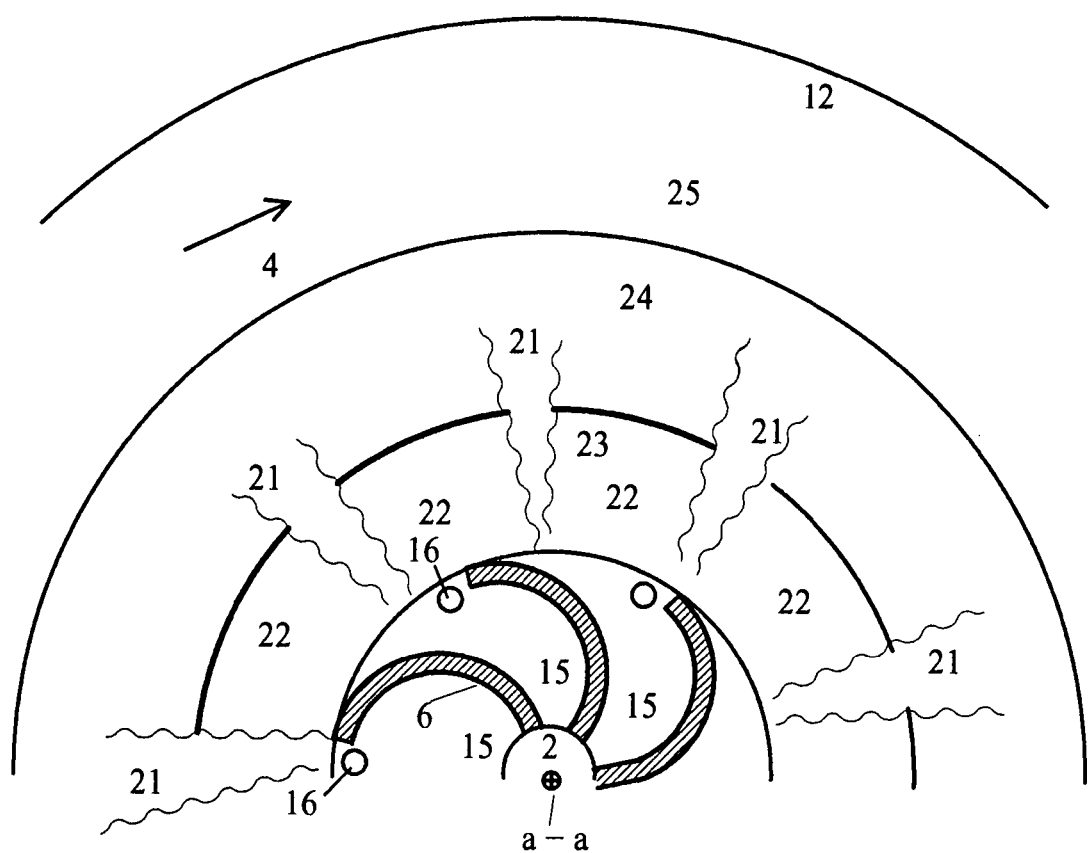
FIG. 2 shows a top view of half the work space of the preferred embodiment shown in FIG. 1, with the top impeller and baffle invisible, showing an array of co-rotating radial vortices between the impellers, a turbulent ring, and mixing zones between the radial vortices and the impellers.

The impellers comprise vanes 6. Various vane designs are known to the art and could be used, including curved vanes as shown in FIG. 2 or angled blades. Viewed in superposition, the vanes of the top and bottom impellers cross. Therefore, during counter-rotation, there will be numerous points in the work space where shear is high between the vanes, and there will be a continuous radially outward movement of those points. Vanes in the flare section 18 at the periphery 12 serve to compress fluid flowing through the periphery into an annular tank 13 and to create a recirculation flow pressure 32. Vanes near the axial feed port 2 serve to advect feed gas radially outward into the work space 3. Vanes near the axial exhaust port serve to protect flow through the axial exhaust port from pollution of heavy fractions by advecting heavy fractions radially outward away from the axial exhaust port 9. See FIG. 5.

Feed gas driven by the impellers 4, 5 of the impeller assembly 19 flows from the axial feed inlet 2 through the work space 3 to the periphery 12 and into a tank 13 in a radially outward flow path between counter-rotating centrifugal impellers. Said flow radially outward from the axis a-a will be referred to as source flow. Source flow comprises heavy fractions, injected liquid, and unseparated light fractions. Source flow is turbulent due to high shear.

Source flow between the impellers is impeded at a pinch section 17 where the impeller surfaces converge and become closely separated. The pinch section is effectively a convergent nozzle, therefore source flow velocity decreases. Drag force opposes the source flow and increases residence time of the feed gas in the high shear environment between the impellers. Mixing of the feed gas with injected scrubbing liquid is enhanced by high turbulence which is mechanically forced. Stalling of source flow at the pinch section differentially affects the light fractions and aids in axial extraction of nitrogen and water vapor to concentrate the scrubbing targets, as will be explained below.

After passing the pinch section 17, what remains of the feed gas after axial extraction of the light fractions flows into a flare section 18, where the separation between the impellers increases. Scrubbing targets, including particulates, NOx, and SOx, have been concentrated and scrubbing liquid has been mixed into the flue gas. The flare section is effectively a divergent nozzle. Vanes 6 on the impellers at the flare section force fluid radially outward into a tank 13. The rotation of the impellers pressurizes the tank.

A tank 13 receives flow through the periphery 12. Preferably, the tank is an annulus disposed about the impeller periphery and connected to the impellers 4,5 through movable seals 29. The seals maintain tank pressure and permit the impellers to slide against the static tank wall. Tank pressure aids in condensing SOx and NOx within the tank, as well as condensing mercury vapor and water vapor. Impellers at the flare section 18 of the impeller assembly pressurize the tank. A recirculation flow pressure 32 due to tank pressure is shown by the right-pointing arrow.

The tank comprises a gas vent 27 communicating with the tank interior and providing means for releasing carbon dioxide out of the pressurized tank for further processing. The gas vent could be of many designs known to the art. The gas vent 27 could also be a Joule-Thomson expansion valve. Carbon dioxide in the tank remains gaseous and monitoring means (not shown) communicating with the gas vent regulate the purity of the stream allowed to escape from the tank through the gas vent 27. The stream through the gas vent has a high concentration of carbon dioxide and has been scrubbed of NOx, SOx and aerosols. If necessary, a second device of the same design receives the output of the gas vent as feed. Cascading devices remove nitrogen, NOx, SOx, and aerosols from the concentrated carbon dioxide stream coming through the gas vent 27.

Figure 4:
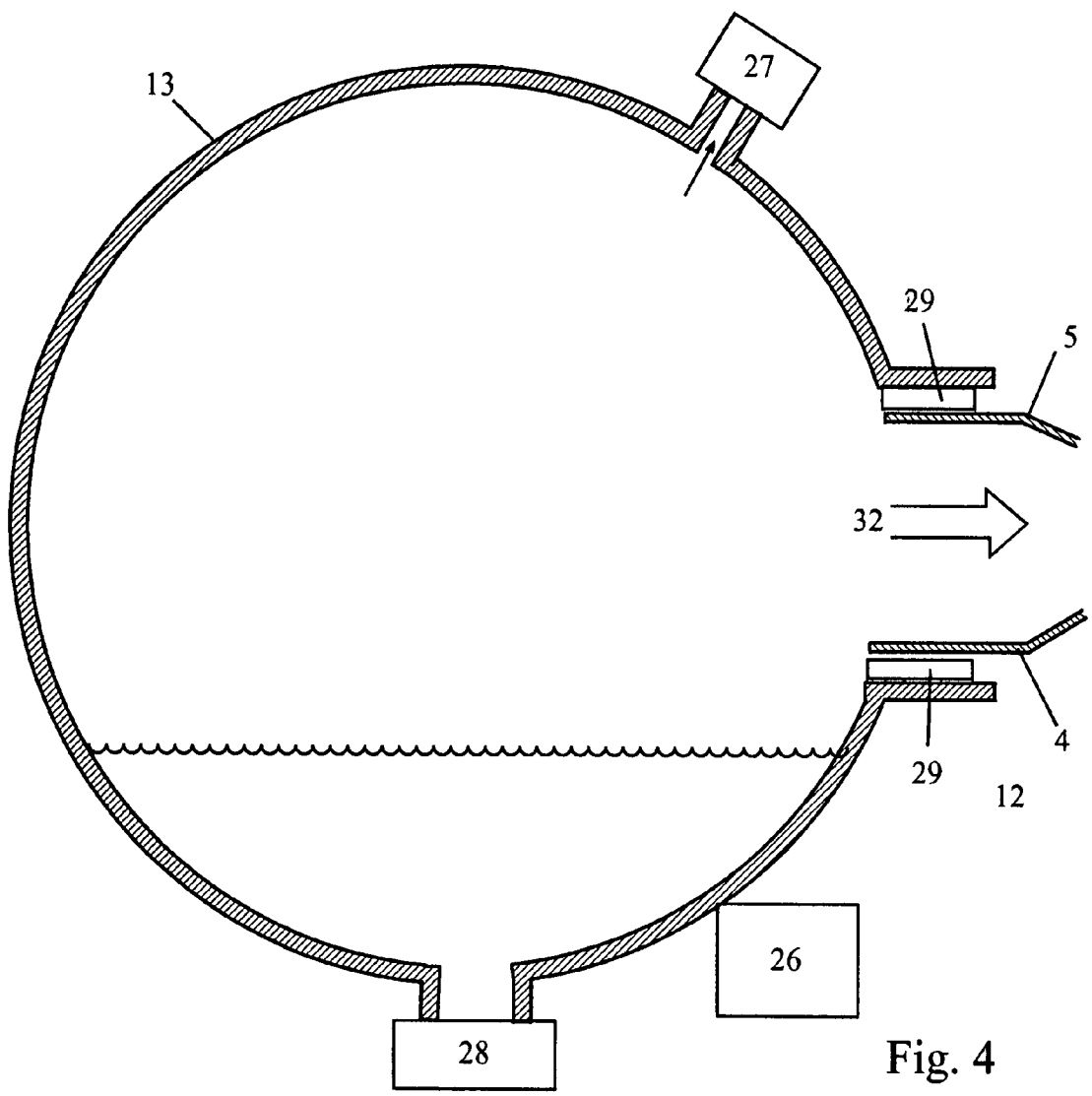
FIG. 4 shows a detail of a side view of the impeller periphery and tank in the preferred embodiment shown in FIG. 1.

The tank also comprises a purge pump 28 communicating with the tank interior and providing means for pumping solids and liquids out of the tank. The purge pump could be of many designs known to the art, including a progressive cavity pump or simply a valve. Flow through the purge pump 28 is a concentrated stream of heavy fractions, including injected liquid, condensates, and particulates from the flue gas. Condensates include condensed NOx and SOx and mercury. Particulates include agglomerated fly ash and other aerosols, as well as precipitates produced by wet scrubbing. FIG. 4 shows a detail of the tank.

The work of the impellers 6 creates a recirculating flow pressure 32, or back pressure, which opposes the source flow and also increases residence time in the pinch section 17. As can be seen, the flare section 18 is effectively a convergent nozzle for back pressure 32 from the tank 13 and at the same time is a divergent nozzle for source flow. Back pressure 32 is focussed into the shear layer and serves to drive light fractions radially inward. Heavy fractions flow along the surfaces of the impellers radially outward into the tank, around the back pressure. Pressure in the tank 13 condenses water vapor, unreacted NOx, unreacted SOx, and mercury, which flow through a purge pump 28 to collection along with agglomerated aerosols and precipitates from scrubbing.

The combination of recirculating flow pressure and high shear between the impellers, which have high tangential velocity at the periphery, causes very high turbulence in the flare section 18. Reynolds numbers on the order of $10^7$ have been reported for analogous von Karman swirling flow in a closely shrouded closed system setup comprising exactly counter-rotating impellers having a high aspect ratio. Therefore excellent mixing occurs in the flare section 18. Mixing of injected liquid with the gas in the flare section, which has been concentrated by axial extraction of nitrogen, wets particulates and contacts NOx and SOx and $CO_2$. Turbulent vortices allow for radially inward extraction of gases produced by sorbent reactions, thus favoring the forward reaction and improving scrubbing efficiency. Mechanically forced turbulence, unlike pressure forced turbulence as with a venturi, will not dissipate and can be continued as long as necessary. Residence time is superior to what is possible with centrifugal mechanically assisted wet scrubbers known to the art, which are rapid flow-through devices.

Residence time in the flare section 18 and the tank 13 can be regulated by adjusting impeller speed and tank evacuation to assure satisfactory scrubbing for a given feed flow. A second device, using the output of the first device as feed gas, would permit tank evacuation even before scrubbing were completed, in the event of a high feed flow.

Condensation of NOx and SOx and mercury occurs in the pressurized tank 13, leaving a gaseous stream of concentrated carbon dioxide coming through the gas vent 27. Nitrogen ballast has been axially extracted upstream of compression. The boiling point of sulfur dioxide is high at $-10°$ C. (263 K) and sulfur trioxide is higher at $45°$ C. Nitrogen dioxide's boiling point is also high, at $21.1°$ C. Scrubbing of NOx, SOx, and mercury from the concentrated carbon dioxide stream by condensation under the tank pressure and by the turbulent sorbent mixing induced by the impeller assembly produces a liquid in the tank having a high concentration of these noxious fractions. The liquid in the tank is evacuated from the tank through the purge pump 28.

An axial exhaust port 9 at the center of the top impeller 5 communicates with an axial exhaust conduit 10. An axial pump 11 communicates with the axial exhaust conduit and provides means for extracting fluid from the work space 3 while the impellers counter-rotate about the axis a-a. Said flow radially inward toward the axis a-a will be referred to as sink flow.

Sink flow is primarily of light fractions, including nitrogen, water vapor, and oxygen. These gaseous fractions constitute approximately 85% of the volume of flue gas and other industrial gaseous emission streams. Sink flow is driven by the suction of the axial pump 11 and by recirculating flow pressure 32 caused by the impellers. The reason that light fractions are differentially advected radially inward is that turbulent eddy vortices concentrate light fractions at tiny vortex axes and away from the impellers, and radial vortices 21 provide coherent low pressure gradients linking these capillaries into an arterial sink flow.

A shear layer 31 exists in the work space 3 due to counter-rotation of the impellers. The shear layer is in a plane approximately equidistant from the impellers and approximately normal to their axis of rotation. Against each impeller is an adherent boundary layer 30 of fluid which rotates along with the impeller. These boundary layers shear each other. Radial vortices 21 created by shear of the boundary layers in the shear layer are an array of coherent tubular vortices having axes radial to the impeller axis of rotation a-a, like spokes in a wheel with the axis a-a as the axle. See FIGS. 2, 3a, 3b, and 5 for more on radial vortices.

The radial vortices 21 provide conduits for flow radially inward to the axial exhaust port 9, or sink flow. Said sink flow conduits exist although feed gas flows around them because there is sufficient mass flow through the radial vortices to sustain coherence. Sink flow is forced by the suction of an axial pump 11 and by the back pressure 32 caused by the impeller assembly pushing fluid into a shrouding tank 13.

Von Karman swirling flow is the name given to the flow in a cylindrical vessel between counter-rotating disks. Recirculation flow from the shrouding cylinder wall, together with the shear between the impellers, can cause extremely high turbulence (Re~$10^7$). However, investigations of von Karman swirling flow have only considered closed vessels with close shrouding walls and high aspect ratios. No flow-through device for performing useful tasks has been disclosed.

A baffle 14 protects the axial exhaust port 9 from intrusion of feed gas. The baffle is connected to the bottom impeller 4 by vanes 6. The baffle rotates along with the bottom impeller. The vanes and baffle define spiral feed conduits 15 for introducing fluid into the work space 3. Injection ports 16 in the spiral feed conduits communicate with a liquid source 20 and provide means for introducing a liquid, such as water or sorbent slurry or solution, into the work space 3 along with the feed gas. Preferably, the injection port comprises a Lobestar® vortex mixing nozzle. Pressurized liquid injection through the injection ports or suction of liquid from the liquid source by feed gas flow could both be used, but pressurized injection is preferable. Feed gas mixes with injected liquid in the spiral feed conduits. The mixture swirls around the axes of the radial vortices in radially outward source flow simultaneous with said radially inward sink flow of light fractions through the radial vortices 21. Feed gas which may somehow enter the space between the baffle and the top impeller is centrifugated out away from the axes of the radial vortices and the eddies and collects at the impeller surfaces where it is advected radially outward away from the axial exhaust port 9.

The foregoing simultaneous radial source-sink flow will be referred to as radial counterflow. Radial counterflow is different from axial counterflow (as practiced in a cyclone or a vortex tube). The difference is that the axis of the counterflow vortices is radial to the axis of rotation of the driving device. Furthermore, known axial counterflow devices are driven by feed pressure, whereas radial counterflow as disclosed in the present invention is mechanically driven.

An axial pump 11 communicates with the work space 3 through the axial exhaust conduit 10 and the axial exhaust port 9. The suction of the axial pump 11 causes fluid to flow from the work space 3 through the axial exhaust port 9 and through the axial exhaust conduit 10 while the impellers 4, 5 are rotating.

Preferably, the axial pump is a steam ejector/eductor, which could be of various designs known to the art, sized to assure constant flow through the axial exhaust port 9 as feed is introduced through the axial feed port 2. Blowdown steam is abundant at the site of coal-fired power plants and could be used for the ejector 11, which does not need to be extremely high tech in order to provide the necessary sink flow. Alternative axial pumps are nitrogen ejectors or blowers and other designs for gas flow known to the art.

Recirculation flow pressure 32 aids the axial pump 11 in extracting light fractions from the work space. Flow through the axial exhaust conduit 10 is a stream having a high concentration of light fractions, including nitrogen, oxygen, and water vapor, at least higher than the concentration of the light fractions in the feed. The flow through the axial exhaust conduit could be feed for another device according to the present invention in order to scrub out remaining pollutants, or might even be immediately emitted to the atmosphere if low enough concentration of pollutants has been achieved in the first stage.

A cascade of scrubbers according to the design shown in FIG. 1 and using the output of the axial exhaust conduit as feed for subsequent stages scrubs enough of the heavy fractions remaining in the light fraction stream to permit discharge of the light fraction stream to the atmosphere.

Nitric oxide (NO, molar mass 30 g/mol) which may be present in the light fraction stream is decomposed in a catalytic converter (not shown) prior to discharge. The operation of the catalytic converter is enhanced by the upstream scrubbing of particulates and other noxious fractions.

Operation of the Preferred Embodiment

Turbulence is conventionally regarded as a useless degradation of mechanical energy, and therefore unworthy of interest except as a nuisance. In the present invention, turbulence is harnessed for carbon capture and scrubbing of flue gas. The forcing regime of an axial pump and a centrifugal impeller assembly, which force flow in opposite directions, integrates the tiny centrifugation effects of turbulent vortices to produce differential radial advection of light and heavy fractions in the gaseous emission stream. Simultaneous source-sink flow is possible through the work space because radial vortices provide sink flow conduits through the source flow.

Eddies in the shear layer and high turbulence between the counter-rotating impellers provide low pressure gradients where low density fractions, such as nitrogen, oxygen, and water vapor, concentrate. Said low pressure gradients communicate circuitously with the low pressure in the axial exhaust conduit 10 caused by the suction of the axial pump 11. Radial vortices 21 provide sink flow conduits for high mass flow of light fractions radially inward. Sink flow is forced by the suction of the axial pump 11 and by a recirculation flow pressure, or back pressure 32 caused by centrifugal flow increasing the tank pressure.

Because it is the light fractions which are in high concentration at the turbulent eddy vortices squeezed by the back pressure and sucked by the axial pump, and it is the heavy fractions which are in high concentration away from the eddy vortex axes and near the centrifugal impellers, there is differential radial advection of heavy and light fractions. Radially outward flow, or source flow, between the impellers has a high concentration of carbon dioxide, NOx, SOx, and aerosols. Radially inward flow, or sink flow, has a high concentration of nitrogen, oxygen, and water vapor. Different fractions are advected in different directions, and are thus separated by density.

An array of co-rotating radial vortices 21 points to the impeller axis a-a like spokes in a wheel (cf. von Karman swirling flow). The radial vortices 21 are sink flow conduits communicating circuitously with the low pressure gradients at the eddy vortex axes, which serve as capillaries feeding sink flow. Each radial vortex comprises coaxial source and sink flows. The impellers drive a source flow swirling around the radial vortex axis and radially outward from the impeller axis. Recirculation flow pressure 32 from the impellers and the suction of the axial pump 11 drives a sink flow swirling inside said source flow and radially inward toward the impeller axis. See FIG. 5.

At each eddy periphery is a concentration of heavy fractions, and adjacent eddies grind heavy fractions together at their peripheries. Injected water, a heavy fraction, contacts particulates and NOx and SOx, also heavy fractions, as they grind together at the eddy peripheries. Fly ash contacted by injected water becomes fly ash slurry. Fly ash slurry at vortex peripheries shear thickens into clumps of agglomerated particles. The clumps tumble in the turbulence and adsorb other clumps and aerosols. Agglomerated aerosols and precipitates in the tank are in large clumps of sludge and therefore are easy to separate from the wastewater.

Nitrogen and other gases which envelop scrubbing targets are stripped away into the eddy vortex axes, thereby improving wetting of particulates, NOx and SOx. Also, gases produced by scrubbing reactions are removed from the reaction zone through the radial vortices, favoring the forward scrubbing reaction by removing reaction products. Residence time is long, turbulence is high, therefore collection efficiency for even fine particulates is high.

Figure 5:
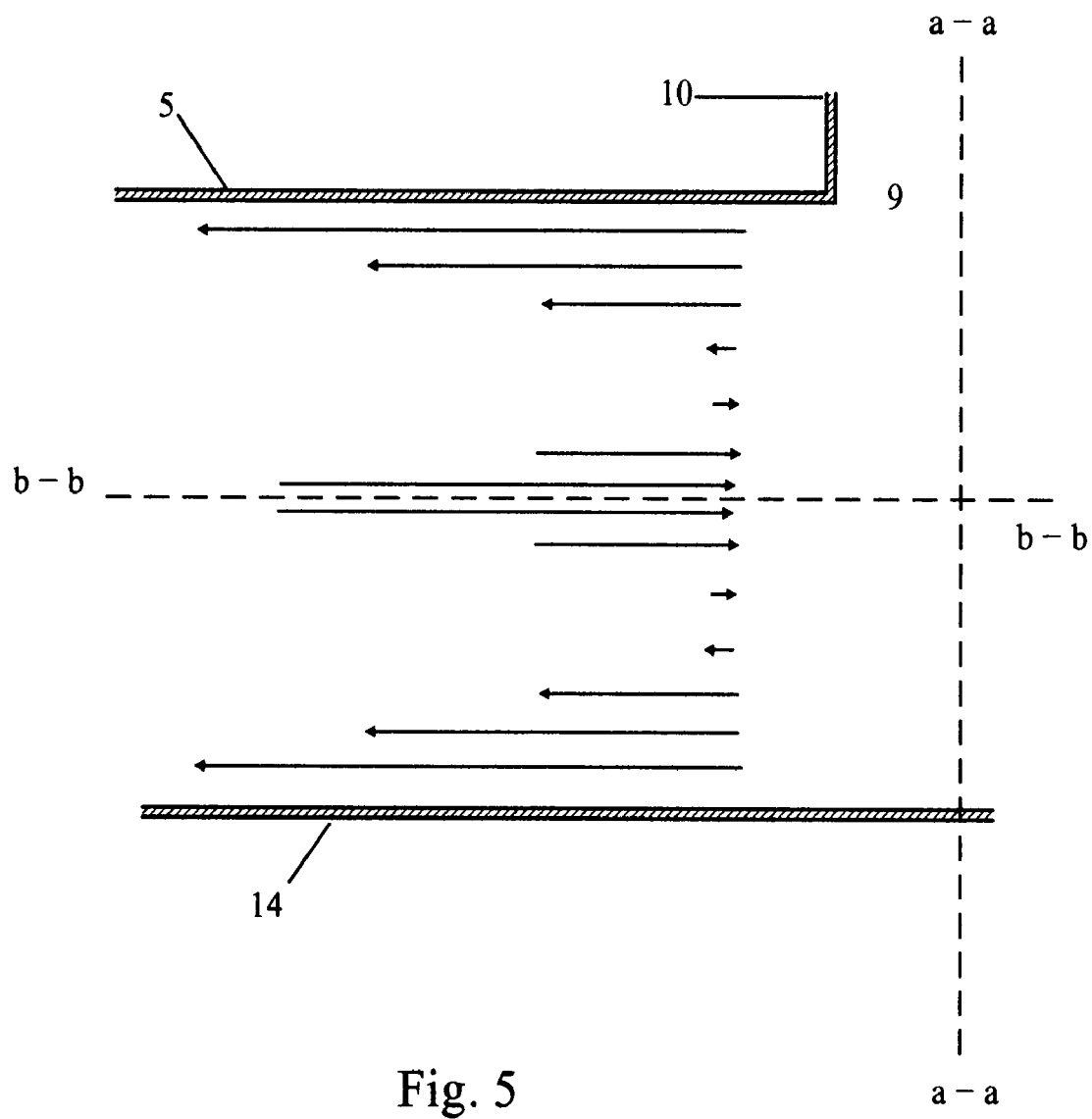
FIG. 5a shows a side cross-sectional view of a radial vortex in the vicinity of the axial exhaust port with vectors showing radial counterflow.

It is important to recognize the difference between radial counterflow and axial counterflow. Axial counterflow, as practiced by the vortex tube and the cyclone (both pressure driven static devices) is source and sink flows centered on the centerline of a tube or a conical tank. Radial counterflow (which is mechanically driven by counter-rotating centrifugal impellers and an axial pump) is coaxial source and sink flows in a plane approximately normal to a centrifugal impeller axis of rotation a-a. FIG. 5 shows the orthogonal axes characteristic of radial counterflow.

The axial pump 11 draws light fractions (such as nitrogen, oxygen, and water vapor) radially inward toward the impeller axis through the radial vortices and stretches the radial vortex axes. Flow swirling around the radial vortices and radially outward between the impellers also stretches the vortex axes. Stretching the vortex axes increases vorticity and sustains coherence of the radial vortices.

The axial pump 11 is not an essential feature, but is preferred. The addition of an axial pump 11 is preferred because the volume of sink flow is large and the mass flow through conduits downstream to eventual discharge needs to be aided to avoid stagnation of sink flow in the work space. Approximately 85% of the feed (by volume) becomes sink flow, and extracting such a large volume from the work space is easier with an axial pump to drive sink flow through the radial vortices.

In addition to coal-fired flue gas, other feed gas from the feed gas source 1a could be gaseous emissions from fossil fuel power plants such as natural gas generators, oil-fired boilers, or internal combustion engines, as well as from cement plants, pulp and paper plants, petrochemical plants, steel plants, municipal waste facilities, medical waste facilities, and other sources of noxious gas mixtures. Also suitable for feed is polluted air from mines and buildings, natural gas, or vacuum cleaner intake. These applications are covered by the claims.

Discussion focuses on use of the preferred embodiment as a pre-treatment device for cleaning and concentrating a carbon dioxide stream out of a feed stream of flue gas from coal-fired power plants. This discussion is by way of illustration and is not intended to limit application of the preferred embodiment to other gaseous feed streams.

Coal-fired power plant flue gas is a major culprit in global warming and air pollution. This smoke is a high temperature gaseous emission stream comprising benign fractions including nitrogen, water vapor and oxygen, which constitute approximately 85% by volume. The benign fractions have low density relative to the other fractions in flue gas and therefore are called light fractions. Nitrogen gas ($N_2$) has a molar mass of 28 g/mol; water vapor ($H_2O$) is 18 g/mol; and oxygen ($O_2$) is 32 g/mol.

Heavy fractions in the smoke include carbon dioxide ($CO_2$), which has a molar mass of 44 g/mol, nitrogen oxides (NOx, principally $NO_2$ which has a molar mass of 46 g/mol), sulfur oxides (SOx, principally $SO_2$ which is 64 g/mol, and $SO_3$ which is 80 g/mol), mercury vapor (200 g/mol), mist, fly ash, soot, and dust. The heavy fractions are significantly more dense than the light fractions, hence the name heavy fractions.

To explain further the application of molar mass to density, a mole is Avogadro's Number ($6.022 \times 10^{23}$) of gas molecules. Applied to a gas mixture, like flue gas, this many molecules of the mixture occupy a certain volume according to their temperature and pressure, and whatever that volume is, each constituent in the gas mixture contributes a certain mass, which is its molar mass. Molar mass indicates relative density of the constituent gases in an emission stream. Nitrogen is less dense at 28 g/mol (i.e. 28 grams per whatever volume the mole occupies) than carbon dioxide at 44 g/mol. That is a density difference of 36%.

While the centrifugal impellers 4,5 of the impeller assembly 19 counter-rotate about their axis a-a, fluid flow is simultaneous and continuous through the axial feed port 2, the axial exhaust port 9, and the periphery 12. In other words, feed gas through the feed port 2 is continously divided within the impeller assembly 19 into two continuous streams: (1) a radially inward (toward the axis a-a) sink flow of light fractions (in flue gas: nitrogen gas, water vapor, and oxygen) through the exhaust conduit 10, and (2) a radially outward source flow of heavy fractions (in flue gas: carbon dioxide, liquids, mercury, fly ash, NOx and SOx) through the periphery 12. In the tank 13 which receives the flow through the periphery 12, said heavy fraction stream diverges into a concentrated carbon dioxide stream going through the gas vent 27 and a stream of concentrated liquids, solids, NOx, and SOx going through the purge pump 28.

Pollution of sink flow by feed flow is prevented by the baffle 14 and also by the counter-rotation of the centrifugal impellers, which create radial vortices that act as protective sink flow conduits and create radial counterflow of source and sink flow. See FIG. 2. Each eddy vortex in the mixing zone 22 of the turbulence between the impellers radially stratifies light and heavy fractions and keeps them separate.

By the flare section 18 of the impeller assembly, the source flow of feed gas through the axial feed port 2 has become a turbulent and enriched source flow of concentrated heavy fractions, including carbon dioxide, sulfur dioxide, nitrogen dioxide, fly ash, aerosols, and injected liquid. Axial extraction of nitrogen, water vapor, and oxygen, has concentrated the targets for scrubbing, and the turbulence in the flare section caused by the shear between the impellers and the back pressure from the shrouding tank causes excellent mixing and shear thickening of fly ash slurry produced by wet scrubbing.

Cooling of carbon dioxide captured in the tank by differential radial advection and scrubbed by said turbulence occurs through axial extraction of light fractions together with their heat through the axial exhaust conduit 10, by liquid injection, by expansion, and by heat transfer with the impellers through the heat transfer means 26, 26a. Expansion of the pressurized carbon dioxide in the tank through the gas vent 27 cools it further. Suitable means known to the art can use the concentrated, cooled and cleaned carbon dioxide stream issuing through the gas vent change the stream into a form suitable for sequestration or other treatment.

Shear between the impellers should keep the flow path into the tank for heavy fractions clear. Periodic injections of abrasive particles, such as bottom ash, through the axial feed conduit 1 while the impellers are in counter-rotation could clean the impeller surfaces.

The liquid injected depends on the wet scrubbing to be performed. For SOx, a slurry of sorbents known to the art (lime or limestone for example) would be the liquid, for NOx the sorbent known to the art is ammonia, and for fly ash plain water.

High shear between the counter-rotating impellers 4, 5 creates high turbulence in the flow path of feed gas through the work space 3. Turbulence results in a drag force which reduces the velocity of radially outward flow, thus increasing time available for mixing liquid with aerosols and the NOx and SOx gases. Back pressure 32 from the shrouding tank 13 also increases residence time for turbulent scrubbing. Turbulence causes aerosols to collide and cohere and improves wetting of particles enveloped by adhering gas molecules.

Extraction of gases, such as carbon dioxide produced by wet scrubbing sorbent reactions, into the eddy vortices favors the forward scrubbing reaction. Unreacted SOx and NOx is too dense to join the sink flow of nitrogen, oxygen, water vapor, and carbon dioxide in the flare section and tumbles in the turbulence of the flare section 18 until it is reacted. Long residence time of SOx in this recirculation through high turbulence results in high collection efficiency. Pressure in the tank 13 caused by the impeller assembly 19 improves collection efficiency by condensing unreacted SOx and NOx.

Latent heat in water vapor and heat in the extracted nitrogen is available through the axial exhaust conduit 10 to be recycled into power production, such as by preheating feedwater, instead of going out the smokestack to heat the atmosphere.

Cascading numerous devices of the present invention would further cool, concentrate, and clean the carbon dioxide captured from the flue gas. The output of the first device (through the gas vent 27) is the feed to a second radial counterflow separator, and so on, with the concentration and purity of carbon dioxide increasing at each stage.

Dry scrubbing, without water injection, could also be practiced in the present invention, with fine particulate matter agglomerating by collisions in the highly turbulent flow and cohering by van der Waals force. Kinetic energy in turbulence, especially where eddy vortex peripheries grind together, overcomes electrostatic repulsion and allows particles to stick together in inelastic collisions. Dry scrubbing is aided by extraction of gases into the eddy vortices, which removes the shielding envelope of gas surrounding fine particles. However, wet scrubbing is preferred for the gaseous emission stream produced by coal-fired power plants because the water also captures $SO_3$ and other gases, and it improves the collection of fly ash sludge by shear thickening.

Preferably, the impellers and the tank are cooled by suitable means known to the art 26, 26a such as air or liquid flow against the outside surfaces of the impeller assembly 19, so as to enhance heat exchange with the hot gas in the work space 3.

The centrifugated sorbent, wet or dry, serves to drag feed gas radially outward through the turbulence in the pinch section 17 between the impellers and into the flare section 18 of the impeller assembly, where very high turbulence exists due to the combination of high tangential velocity of the counter-rotating impellers and back pressure 32.

Those of ordinary skill in the art of emissions control will be able to adjust by theory or experimentation the impeller separation, diameter, and rotation speed relative to the feed conduit diameter and pressure and temperature conditions of the inlet and outlets to achieve the most effective fluid separation for various fluid fractions and flow rates. It is important to note, however, that the flow through the periphery 12 will have been reduced significantly in mass from the flow through the feed conduit, due to the axial extraction of nitrogen and water vapor through the axial exhaust conduit 10.

FIG. 2 shows a top view of half of the work space 3 in the preferred embodiment shown in FIG. 1 during counter-rotation of the impellers, looking toward the bottom impeller 4. Direction of impeller rotation is shown by the arrow. Discussion focuses on use of the preferred embodiment for capture of carbon dioxide from flue gas. The top impeller 5 is invisible and so is the baffle 14. These are shown in FIG. 1 but not here.

Feed gas enters the work space 3 from the axial feed inlet 2 and is centrifugally impelled radially outward from the impeller axis of rotation a-a by curved vanes 6. Shown are a plurality of spiral vanes, but a variety of vane designs known to the art of centrifugal pumps could be used. Injection ports 16 introduce liquid into the feed gas. Direction of rotation of the bottom impeller 4 is shown by an arrow. Rotation of the bottom impeller and its vanes 6 drives injected liquid and feed gas into the work space and radially outward to the periphery 12. Injected liquid from the injection ports 16 atomizes and the centrifugated droplets drag feed gas radially outward.

A shear layer 31 exists between the counter-rotating centrifugal impellers, and within the shear layer is an array of coherent co-rotating radial vortices 21 pointing to the axis of rotation a-a like spokes in a wheel having the impeller axis a-a as its hub. The radial vortices are shown truncated approximately where the baffle 14 would be because the radial vortices extend to the axial exhaust port 9, not shown here because the top impeller is invisible. The radial vortices are conduits for sink flow of light fractions radially inward through the work space 3 toward the impeller axis a-a.

The work space 3 comprises three concentric rings: a laminar ring 23 nearest the center of the work space and the axis of rotation of the impellers, a turbulent ring 24 distal to the laminar ring, and an expansion ring 25 distal to the turbulent ring and extending to the periphery 12. Flow is relatively less turbulent in the laminar ring than in the turbulent ring, but there is turbulence in all rings. The turbulent ring 23 is at the pinch section 17 and the expansion ring 18 is at the flare section of the impeller assembly 19. Turbulence in the expansion ring may be even greater than in the turbulent ring. It is useful to picture the turbulence between the impellers as a chaotic sponge of heavy fraction shells and light fraction voids. Centrifugal separation by radial density stratification within vortices large and small creates the shells and voids.

Light fractions including nitrogen and water vapor concentrate along the axis of each turbulent eddy vortex, forming voids or vacuoles having low density and low pressure. Heavy fractions are centrifugated to the periphery of each vortex, forming shells, or crusts having high density. High pressure exists in the heavy fractions because they are confined by the impellers and grinding on each other as adjacent vortices rotate. When the shells grind together, fly ash, NOx, and SOx mix with injected liquid. Shells can grind together a long time because turbulence is mechanically forced by the impellers. Shear between adjacent vortices agglomerates and shear thickens fly ash slurry into easily separable clumps of sludge.

Feed gas also stratifies radially by density about the impeller axis a-a, which is orthogonal to the vortex axes in the shear layer. Differential radial advection drives heavy fractions radially outward to the periphery 12 and light fractions radially inward through the radial vortices 21 to the axial exhaust port 9. Extraction of nitrogen and water vapor from carbon dioxide is continuous, both in the turbulent eddies and in the bulk. The present invention provides means for connecting the heretofore useless centrifugal separation performed by turbulent eddies with the centrifugal separation performed by centrifugal impellers and the axial pump. The tiny effects in turbulence are integrated by the forcing regime to produce separation of gaseous fluid mixtures by density.

Figure 3A:
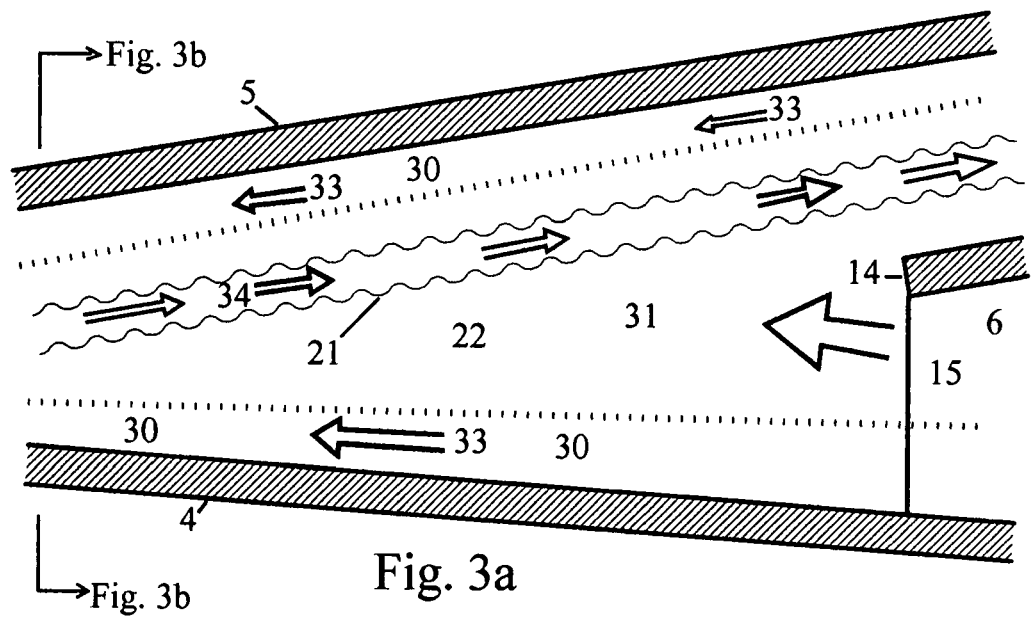
FIG. 3a shows a detail of a side view of a portion of the work space, showing flow paths for the heavy and light fractions, and the shear layer between the impellers.
Figure 3B:
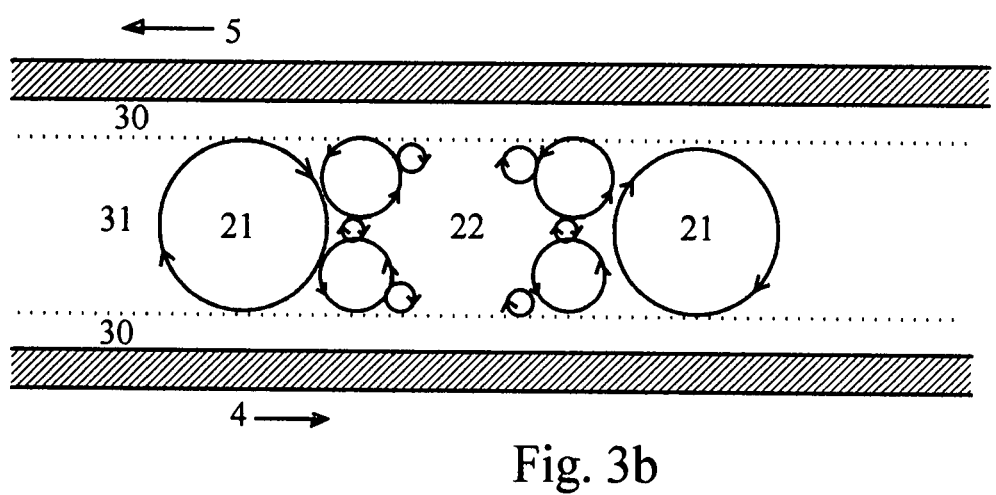
FIG. 3b shows a cross sectional view from the axis of rotation into the turbulent ring.

FIG. 3a shows a detailed schematic cross-section of the laminar ring 23 of the work space between the impellers 4, 5 of the preferred embodiment shown in FIG. 1. A shear layer 31 between boundary layers 30 against the impellers has high vorticity due to counter-rotation of the centrifugal impellers 4,5 as shown in FIG. 1 and FIG. 3b. Feed gas is introduced through radial feed conduits 15 as shown by an arrow. Highly turbulent mixing occurs in a mixing zone 22 between counter-rotating centrifugal impellers 4,5.

Eddy vortices in the mixing zone 22 centrifugate heavy fractions (including carbon dioxide, NOx, SOx, and particulates) away from their vortex axes, where light fractions (including nitrogen, water vapor, and oxygen) concentrate. Heavy fractions concentrate in the boundary layers 30 against the impellers. Rotation of the impellers causes molecules of heavy fractions to flow radially outward. Light fractions are preferentially advected radially inward toward the impeller axis, in sink flow, by the suction of an axial pump shown in FIG. 1 and by back pressure 32 as explained under FIG. 1. Said differential radial advection of light and heavy fractions occurs because of radial stratification of fractions by density in the vortices of the shear layer. See FIG. 5 for a more detailed explanation.

Radial vortices 21 in the shear layer 31 provide coherent conduits for sink flow 34 (shown by arrows) of light fractions radially inward toward the impeller axis of rotation a-a. Each radial vortex comprises a peripheral swirling source flow 33 (first vortex) and a coaxial interior swirling sink flow 34 of light fractions (second vortex). Both the source flow and the sink flow stretch the vortex axis, increasing vorticity and sustaining coherence.

Axes of the vortices in the shear layer are generally aligned in the plane of the shear layer 31. Should any axis stick out of the shear layer, it would be torqued back into the shear layer plane by the counter-rotating boundary layers 30. The combined work of numerous tiny centrifugating eddies in the bulk eventually concentrates heavy fractions away from the shear layer and toward the surfaces of the impellers where they concentrate in the boundary layers 30. Concentration of heavy fractions in the boundary layers advected by the impellers increases toward the impellers and away from the impeller axis a-a.

Advection radially outward from the axis a-a preferentially affects heavy fractions, which, due to eddy centrifugation, are in high concentration in the boundary layer 30. Source flow therefore comprises high concentrations of heavy fractions. Once past the turbulent ring, the concentrated heavy fraction stream and its carbon dioxide, NOx, SOx, particulates, mercury, and injected liquid are churned in extreme turbulence in the expansion ring 25. Because nitrogen ballast is axially extracted through the radial vortices, scrubbing targets are concentrated in this turbulence. Gases produced by sorbent reactions are extracted away from the reaction zones at the turbulent vortex peripheries into the turbulent vortex axes. Precipitates and agglomerated aerosols are shear thickened into clumps, and the clumps snowball as they tumble in the turbulence, becoming larger clumps.

Recirculation flow pressure 32 from the tank (not shown) and drag force from turbulent impedance of source flow oppose radially outward source flow between the impellers, but the heavy fractions gain enough momentum from the impellers to pass into the tank despite the opposition. Said opposition preferentially advects light fractions, which are in high concentration in the shear layer and therefore receive little momentum from the impellers.

At the expansion ring 25 there is high turbulence between the impellers, which concentrates light fractions at vortex axes. The eddy vortices are low pressure gradients serving as capillaries for sink flow squeezed radially inward by the back pressure 32. The radial vortices collect the flow from the capillaries in the expansion ring as well as the mixing zones 22 of the turbulent ring 24 and the laminar ring 23.

Sink flow through the axial exhaust port 9 and the axial exhaust conduit 10 comprises high concentrations of light fractions. The sink flow could become the feed for a second device of the same design, in a cascade, so as to purify the light fraction stream prior to discharge into the atmosphere. The preferred embodiment of the present invention is a simple, low-tech device easily scalable to separate high volume dirty hot waste gas streams.

FIG. 3b shows another cross-section of the work space 3 as seen from the impeller axis a-a. A boundary layer 30 is in contact with the surfaces of the impellers 4, 5, and boundary layer source flow is into the page due to impeller counter-rotation, shown by the arrows. Radial vortices 21 co-rotate clockwise as shown by arrows. The radial vortices are conduits for sink flow, out of the page. Adjacent vortices rotate counterclockwise, and smaller and smaller vortices appear between the radial vortices 21. The space between radial vortices is a mixing zone 22. All vortices, whether large or small, are driven by the forcing regime of the impellers and the axial pump.

In the mixing zones 22 between the radial vortices, eddies, or fine-scale vortices, rotate in different directions, as shown. The complex vortex structure in the mixing zone 22 comprises shells and voids in a chaotic sponge; the representation in this drawing is merely a crude illustration of the complexity. In each vortex, radial stratification by density separates light from heavy fractions in the feed gas. Peripheries of adjacent turbulent eddy vortices grind together, thus contacting, pressuring, and mixing the heavy fractions, such as injected liquid and particulates, NOx, SOx, and condensible vapors. Slurry from mixing injected liquid with particulates and other aerosols shear thickens into clumps of sludge as the vortex peripheries grind on each other. Clumps tumbling in the turbulence agglomerate and adhere aerosols. Momentum of clumps advected radially outward assists source flow through the turbulent ring 24.

Two simultaneous radial stratifications separate the feed gas: one in the vortices of turbulence, which are in a plane normal to the axis a-a, and another in source-sink flow with respect to the axis a-a. The combination of the two simultaneous radial stratifications causes differential radial advection of heavy and light fractions, with heavy fractions going radially outward from the impeller axis of rotation, and light fractions going radially inward through radial vortices. See FIG. 5.

FIG. 4 is a detail of the tank shown in FIG. 1. The interior of the tank 13 communicates with the work space 3 of the impeller assembly 19. The tank is pressurized by the impeller assembly 19, which forces fluid into the tank through the periphery 12. Seals 29 between the tank wall and the impellers 4,5 provide means for maintaining the tank pressure and for isolating the tank interior from the atmosphere. Vanes 6 on the impellers 4,5 impel fluid into the tank and also create high shear in the tank. High shear in combination with back pressure 32 creates high turbulence and therefore causes excellent mixing of scrubbing targets with sorbents, and of fly ash with injected liquid.

The flare section 18 of the impeller assembly forms a convergent nozzle which concentrates the recirculating flow pressure 32 into the shear layer between the impellers. The back pressure squeezes sink flow through the vortices and increases residence time of heavy fractions in the turbulence.

Flow through the periphery 12 into the tank 13 is a concentrated stream of carbon dioxide. Preferably, suitable cooling means 26 cool the tank walls. Said cooling means 26 could be of many types known to the art, including a water jacket connected to a brine chiller and means for circulation of brine through the water jacket and the chiller. A gas vent 27 emits a concentrated and pressurized stream of carbon dioxide out of the tank. A follow-on device of the same design shown in FIG. 1 accepts the output of the gas vent as its feed and further concentrates and cleans the carbon dioxide stream, if necessary.

Liquids and solids passing through the periphery 12 along with the carbon dioxide collect at the bottom of the tank and pass through a purge pump 28 to disposal by suitable means.

FIG. 5 shows a cutaway side view of a radial vortex near the axial exhaust port 9 shown in FIG. 1 while the apparatus is in operation. The radial vortex axis b-b lies approximately in a plane normal to the axis a-a of the impellers and in a shear layer between the impellers. Were the radial vortex axis orientation other than parallel to the impellers, torque on the axis b-b from the counter-rotating impellers would twist it back into the plane of the shear layer. Exact counter-rotation of the impellers keeps the radial vortex axis approximately straight and normal to the axis a-a.

The radial vortex 21 is a coherent structure in the turbulence forced by momentum transport from rotation of the impellers and by suction of an axial pump, in an open system. An array of radial vortices sets up in the shear layer as flow occurs through the apparatus shown in FIG. 1. The impellers and the axial pump stretch the radial vortex axis b-b.

Source flow, i.e. flow away from the axis a-a, is shown by the arrows pointing left. Sink flow, i.e. flow radially inward through the work space 3 toward the axis a-a, is shown by the arrows pointing right. Magnitude of the vectors is indicated by the length of the arrows. Both flows are helical about approximately the same axis of rotation b-b. Whether a fluid element (particle) flows radially inward or outward with respect to the axis a-a in the radial vortex depends on its distance from the radial vortex axis b-b. Particles distal to the axis b-b flow radially outward from the axis a-a in source flow, while particles proximal to the axis b-b flow radially inward toward the axis a-a in sink flow. Whether a particle is distal or proximal to the axis b-b is determined by its density. Radial fractionation of fluid fractions by density occurs within the radial vortex, and the radial fractionation determines whether the particle is advected radially inward or outward with respect to the axis a-a.

Heavy fractions, including carbon dioxide, are centrifugated away from the axis b-b and are advected radially outward from the axis a-a in source flow. Carbon dioxide is captured in a tank 13 in a gaseous state. The centrifugal impellers drive source flow.

Light fractions, including nitrogen and water vapor, concentrate near the radial vortex axis b-b and are advected radially inward in sink flow. Pressure gradients drive sink flow, and the pressure gradients are created by the suction of an axial pump 11 as well as a back pressure 32.

The radial vortex 21 is a sink flow conduit for light fractions to go to axial extraction through the axial exhaust port 9. A greater concentration of light fractions is in the sink flow than in the feed flow, leaving a concentrated stream of heavy fractions flowing away from the axis a-a. The light fractions are very much more by volume (>85%) than the heavy fractions (<15%) in flue gas, so there is sufficient mass flow to sustain the coherence of the radial vortices.

As flow through the work space approaches the axial exhaust port 9, heavy fractions entrained in the flow are centrifugated out from the radial vortex axis b-b to the impellers where they join flow advected radially outward away from the axial exhaust port by contact with the top impeller 5 and the baffle 14 which act as centrifugal impellers.

The forcing regime of differential radial advection creates helical counterflow (light fractions flowing in a tornado toward the axial exhaust port, heavy fractions flowing in an enveloping tornado away from it) about the axis b-b, which is source-sink flow with respect to the impeller axis a-a.

The density difference between carbon dioxide (44 g/mol) and nitrogen (28 g/mol) is 36%. Water vapor at 18 g/mol is even less dense than nitrogen, and the density difference between water vapor and carbon dioxide is 59%. NOx and SOx are even denser than carbon dioxide, so the density difference between them and nitrogen is even more. Aerosols are much denser than said gases, so the density difference between aerosols, especially agglomerated particulates, and nitrogen gas is very very great. The denser the fluid fraction, the more distal it is from the axis b-b and the more it is advected radially outward from the axis a-a.

Nitrogen, water vapor, and residual oxygen—the light fractions—predominate in sink flow toward the axial exhaust port 9. The net separation effect from the forcing regime should be evident from the foregoing discussion and may be determined more exactly by experiment or computation by those of ordinary skill in the art.

The radial vortex exists in an open system, i.e. a system having material flow in and out more or less continuously. It is therefore distinguishable from the radial vortices which appear under certain conditions in closed system von Karman swirling flow. Sustained coherent vortices even in highly turbulent flow are possible because the system is open.

Figure 6:
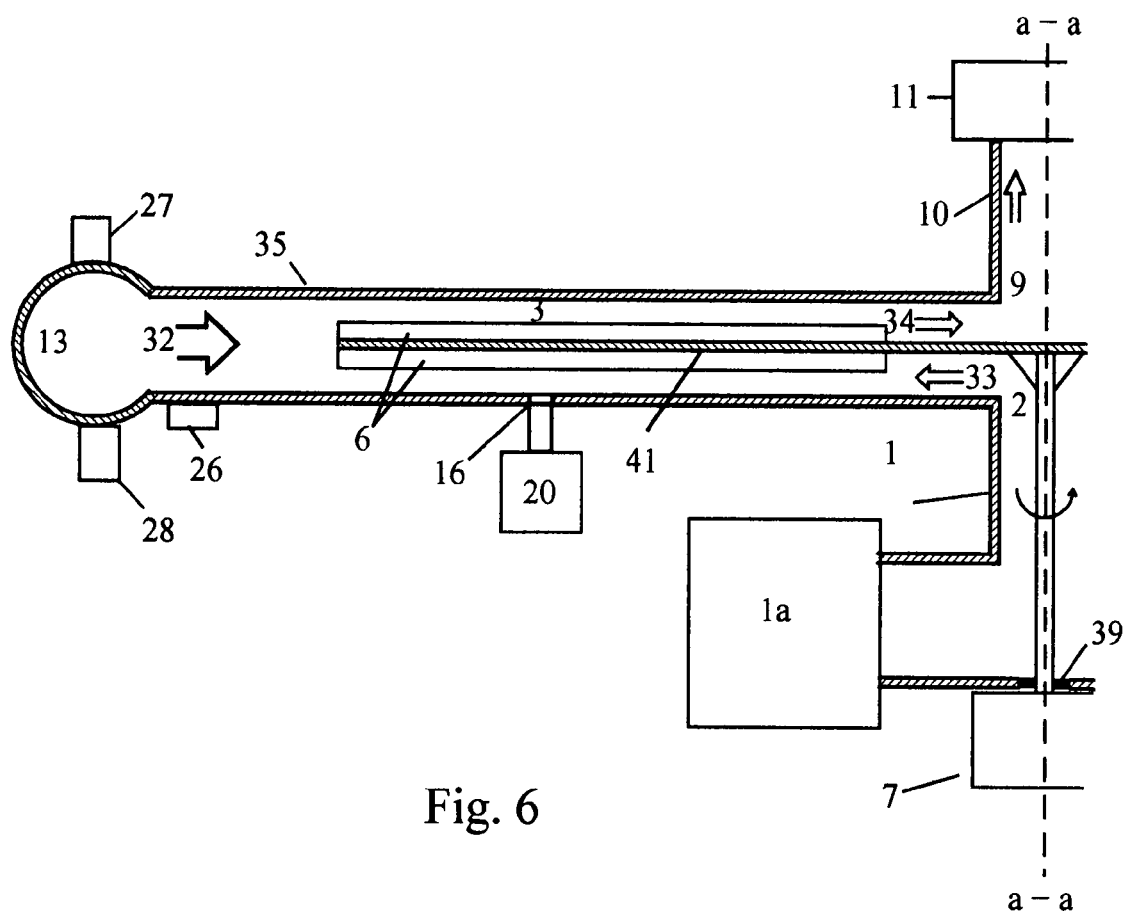
FIG. 6 shows an alternative embodiment, comprising a single impeller within a casing.

FIG. 6 shows an alternative embodiment for flue gas scrubbing, comprising a single centrifugal impeller 41 having vanes 6 on both sides and disposed within a casing 35. A drive spindle 42 connected to a motor 7 and connected to the casing through a bearing seal 39 causes the centrifugal impeller 41 to rotate within the casing 35 and thereby to advect feed gas from a source 1a through an axial feed conduit 1 and into the casing.

Scrubbing liquid from a source 20 is injected through an injection port 16 into the feed gas. The scrubbing liquid mixes with the feed gas in high turbulence caused by shear of the fluid between the impeller and the casing.

A tank 13 at the periphery of the casing receives flow advected by the impeller. Rotation of the impeller 41 creates a recirculation flow pressure or back pressure 32 shown by the right-pointing arrow which is in a direction pointing toward the impeller axis of rotation. The tank comprises a gas vent 27 for evacuating carbon dioxide and a purge pump 28 for evacuating condensates, liquid, and solids. Pressure within the tank is caused by the impeller 41 driving fluid into the tank, and pressure causes mercury, NOx and SOx to condense and flow through the purge pump.

The recirculation flow pressure 32 provides means for advection of light fractions in sink flow radially inward toward the impeller axis a-a and into an axial exhaust conduit 10 communicating with an axial pump 11. The axial pump is preferably a steam ejector/eductor. The axial pump sucks light fractions through the axial exhaust conduit. Thus light fractions including nitrogen, water vapor, and residual oxygen are axially extracted from the flue gas within the casing, thereby increasing carbon dioxide concentration in the tank 13.

Shear in the work space 3 between the impeller vanes 6 and the casing 35 causes high turbulence and many fine-scale eddy vortices in the work space 3. At the axes of all vortices are low pressure gradients. In each vortex, light fractions concentrate at the vortex axes, and heavy fractions are centrifugated to the vortex periphery. Adjacent vortices grind together at their peripheries, causing contact of liquid with scrubbing targets and shear thickening of scrubbing slurry.

Radial stratification by density takes place in each of the fine-scale eddy vortices, and recirculation flow pressure 32 drives light fractions radially inward along the eddy vortex axes and eventually into the axial exhaust conduit 10. The net effect of innumerable fine-scale vortices working in unison is to separate heavy from light fractions. This net effect is harnessed by differential radial advection forced by the axial pump 11 and the centrifugal impeller 41. Both the axial pump and the recirculation flow pressure drive sink flow.

The axial pump is only one means for driving sink flow, and recirculation flow pressure alone could be sufficient. However, for large scale gas separation such as flue gas at power plants, where abundant steam is available for steam ejectors, and the volume of nitrogen and other light fractions to be extracted is very large, an axial pump is a preferable feature.

Flow between the impeller 41 and the casing 35 radially inward to the axial exhaust conduit 10 will be very turbulent due to shear in the fluid between the impeller and the casing. However, there is a macroscopic forcing which organizes the behavior of fluid in this space. Next to the impeller 41 is a boundary layer which is advected radially outward from the axis a-a by impeller rotation. Recirculation flow pressure 32 and the suction of the axial pump 11 drive light fractions radially inward along the casing into the axial exhaust conduit 10. By the time gas reaches the axial exhaust port 9 it will have a higher concentration of nitrogen and water vapor than the gas passing through the axial feed port 2. Thus nitrogen and water vapor are axially extracted from flue gas, leaving a concentrated carbon dioxide stream emitted through the gas vent 27.

FIG. 7a shows the preferred drive means for causing counter-rotation of centrifugal impellers 4, 5 of the impeller assembly 19. A drive wheel 38 connected by a drive spindle 37 to a drive motor 36 engages the impellers at their periphery. The drive spindle goes through the tank wall and the tank and drive spindle are separated by a movable seal. A transmission (not shown) connected to the motor and the drive spindle provides means for high startup torque. Preferably, on startup of the preferred embodiment, the tank is allowed to vent freely and remain unpressurized, and the impellers, which have high rotational inertia, are gradually brought up to speed before feed is introduced and the tank pressure increased by closing the gas vent 27.

Preferably, the drive wheel has a non-slip surface such that there is high friction between the drive wheel and the impellers. Shown is a surface having a variety of angular protrusions in different orientations. Another alternative is cogs which fit into grooves in the impellers, the impeller grooves being unobstructed channels for flow of sludge radially outward and into the tank. Other suitable means for increasing the friction between the drive wheel and the impellers include rubber and abrasive surfaces. Rotation of the drive wheel drives the impellers in opposite directions at the same angular velocity. The drive spindle engages the tank 13 at a bearing seal 39. The drive wheel provides means for maintaining the impellers at a certain separation distance.

FIG. 7b shows a top view of the preferred embodiment, comprising three equidistantly spaced preferred counter-rotation drive means of FIG. 7a. Three or more drive units provide means for maintaining the impellers separated, and more units are preferable so that if one unit breaks during operation, it may be put into free wheeling mode until repair can be done.

Having the benefit in hindsight of instruction provided by the above detailed description of the present invention, and the exposition of the problem to be solved and the prior art, those skilled in the art of emissions control or centrifugal gas separation will see obvious modifications which may be made to the invention. It is not intended that the admitted possibility of such future modifications should imply any admission by the inventor that the best mode for practicing the invention has not been disclosed. The best mode presently known to the inventor for the particular application to flue gas concentration and scrubbing has been disclosed. Future improvements or modifications by others should not alter or nullify the effect of the claims.

Nor should instructed hindsight on the part of those of more than ordinary skill in the particular art affected by the present invention be admitted as ex post facto evidence to the effect that the present invention was obvious or that they could easily have conceived it had they bothered, when the serious problem of flue gas pollution and global warming has remained unsolved by so many for so long.

Obviously, cascading devices according to the present invention would improve collection efficiency. In other words, the light fraction stream coming from the axial exhaust conduit 10 is fed into a second device and separated further, and so on, until the light fraction stream is ready for discharge or for use. Also, the heavy fraction stream coming from the tank vent 27 is made the feed for a second device, etc.

It should also be apparent to those of ordinary skill in various other arts what particular application may be made given the disclosure in the present invention. Dry scrubbing as well as wet scrubbing is included. Dry particulate matter coheres by van der Waals forces due to numerous inelastic collisions in a highly turbulent environment with gas being continuously extracted so as to remove the envelope of gas particles from the scrubbing targets. Many applications to separation of fluid mixtures other than flue gas are possible and should be obvious, along with necessary modifications.

For example, natural gas scrubbing could be accomplished by the present invention, with methane being the light fraction axially extracted, and hydrogen sulfide, condensible vapors, carbon dioxide, and water being among the heavy fractions advected radially outward to compression in a tank and scrubbed in high turbulence.

Vacuum cleaners using axially-fed counter-rotating centrifugal impellers would exhaust clean gas and agglomerate even fine dry particles by van der Waals forces in highly turbulent conditions at the impeller periphery.

Improved air cleaners for mine or building ventilation are another obvious application of the teachings herein. Therefore, it is not intended that the scope of the invention be limited to the specific embodiments described, which are merely illustrative of the present invention, i.e. the disclosed apparatus and method for radial counterflow gas separation and highly turbulent scrubbing, and not intended to have the effect of limiting the scope of the claims except as specifically stated in the claims.

I claim:

1. A method for continuous vortex separation of a gaseous mixture, the gaseous mixture comprising light fractions and heavy fractions, the method comprising:
    counter-rotating a pair of coaxial centrifugal impellers about an axis of rotation;
    introducing a feed comprising the gaseous mixture axially along the axis of rotation into a work space defined between the coaxial counter-rotating centrifugal impellers;
    advecting the feed radially outward away from the axis of rotation through the work space in boundary layers against the impellers as the impellers counter-rotate;
    centrifugally separating the heavy fractions from the light fractions in fine-scale vortices of a shear layer between the boundary layers;
    advecting the separated light fractions radially inward to the axis of rotation through the work space;
    extracting light fractions from the work space axially along the axis of rotation; and
    advecting the separated heavy fractions radially outward away from the axis of rotation and out of the periphery of the work space.

2. The method of claim 1, additionally including injecting scrubbing liquid into the gaseous mixture and purging liquid and agglomerated solids from a tank.

3. Apparatus for continuous vortex separation of a gaseous mixture, the gaseous mixture comprising light fractions and heavy fractions, the apparatus comprising:
    an impeller assembly configured to separate the light fractions from the heavy fractions, the impeller assembly comprising:
        centrifugal impellers defining between them a work space, wherein one of the impellers is rotatable relative to the other of the impellers;
        an axial feed port in one of the impellers and an axial exhaust port in the other impeller, each of said ports communicating with the work space and being approximately centered on the impeller axis of rotation, wherein said axial feed port is configured to receive the gaseous mixture while the impellers are rotating relative to each other and wherein the axial exhaust port is configured to receive the light fractions while the impellers are rotating relative to each other;
        a baffle disposed between the axial feed port and the axial exhaust port; and
        a driver connected to the impellers; and
    a shrouding tank communicating with the work space and configured to collect the heavy fractions.

4. The apparatus of claim 3, wherein the impellers are counter-rotatable.

5. The apparatus of claim 4 further comprising means for pumping light fractions radially inward through the work space and through the axial exhaust port while the impellers are counter-rotating.

6. The apparatus of claim 3 wherein the driver comprises a drive wheel connected to a drive motor, the drive wheel engaging the impellers at their periphery.

7. The apparatus of claim 3 wherein at least one of the impellers comprises vanes extending into the work space.

8. The apparatus of claim 3 additionally comprising means for injecting scrubbing liquid into the gaseous mixture.

9. Apparatus for separating a gaseous mixture using a single centrifugal impeller, the gaseous mixture comprising light fractions and heavy fractions, the apparatus comprising:
    a casing comprising an axial feed port and an axial exhaust port, the casing also comprising a gas vent and a purge pump;
    a single centrifugal impeller, the impeller comprising a baffle disposed within the casing between the axial feed port and the axial exhaust port, the impeller rotatable about an axis of rotation which is approximately at the centerline of the casing and the axial feed port and the axial exhaust port, the impeller spaced apart from the casing so as to define a flow path radially outward between the impeller and the casing on the side of the casing having the axial feed port, and a radially inward flow path between the impeller and the casing on the side of the casing having the axial exhaust port;
    a driver connected to the impeller; and
    an axial pump communicating with said radially inward flow path through the axial exhaust port.

10. The apparatus of claim 9, wherein said axial pump is a steam ejector.

11. The apparatus of claim 9, wherein the impeller comprises vanes.

12. Apparatus for removing contaminants from a pressurized natural gas feed stream, comprising:
    an impeller assembly configured to separate the contaminants from the pressurized natural gas feed stream, the impeller assembly comprising:
        coaxial counter-rotatable centrifugal impellers defining between them a work space;
        an axial feed port in one of the impellers and an axial exhaust port in the other impeller, each of said ports communicating with the work space and being approximately centered on the impeller axis of rotation, wherein said axial feed port is configured to receive the natural gas feed stream while the impellers are counter-rotating and wherein the axial exhaust port is configured to receive methane while the impellers are counter-rotating, each impeller comprising vanes extending into the work space; and a baffle disposed between the axial feed port and the axial exhaust port; and a shrouding tank communicating with the work space and configured to collect the contaminants; and an axial feed conduit configured to connect a source of pressurized natural gas to the work space through the axial feed port.

13. The apparatus of claim 12, wherein the impellers are configured to be turned by flow through the apparatus.

14. Apparatus for mechanically assisted highly turbulent scrubbing of a gaseous mixture, the gaseous mixture comprising at least one scrubbing target selected from the group consisting of $CO_2$, aerosols, NOx, SOx, fly ash, dust, vapor, soot, and mercury, and the gaseous mixture further comprising gaseous light fractions, the apparatus comprising:

an impeller assembly configured to separate at least one of the scrubbing targets from the light fractions, the impeller assembly comprising:

coaxial counter-rotatable centrifugal impellers defining between them a work space;

an axial feed port in one of the impellers and an axial exhaust port in the other impeller, each of said ports communicating with the work space and being approximately centered on the impeller axis of rotation, wherein said axial feed port is configured to receive the gaseous mixture while the impellers are counter-rotating and wherein the axial exhaust port is configured to receive the light fractions while the impellers are counter-rotating;

a baffle disposed between the axial feed port and the axial exhaust port; and a driver connected to the impellers;

an axial pump communicating with the work space through the axial exhaust port; and a shrouding tank communicating with the work space and configured to collect the at least one of the scrubbing targets.

15. The apparatus of claim 14, wherein the axial pump is a steam ejector.

16. The apparatus of claim 14, wherein the light fractions comprise nitrogen gas.

17. The apparatus of claim 14, further comprising an injection port for injecting scrubbing liquid, the injection port communicating with a source of the scrubbing liquid.

18. The apparatus of claim 14, wherein the impellers comprise vanes extending into the work space.

19. The apparatus of claim 14, wherein the shrouding tank is configured such that the at least one of the scrubbing targets and a scrubbing liquid are evacuatable therefrom.

20. The apparatus of claim 19, further comprising a purge pump communicating with the interior of the shrouding tank.

21. The apparatus of claim 3, wherein the shrouding tank is an annular tank disposed around impeller assembly.

22. The apparatus of claim 4 further comprising means for introducing the gaseous mixture into the work space through the axial feed port while the impellers are counter rotating.

* * * * *